US010390272B2

(12) United States Patent
Henry et al.

(10) Patent No.: US 10,390,272 B2
(45) Date of Patent: *Aug. 20, 2019

(54) INBOUND HANDOVER FOR MACROCELL-TO-FEMTOCELL CALL TRANSFER

(71) Applicant: AT&T Intellectual Property I, L.P., Atlanta, GA (US)

(72) Inventors: Paul Shala Henry, Holmdel, NJ (US); Patrick P. Iannone, Redbank, NJ (US); Byoung-Jo J. Kim, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 51 days.

This patent is subject to a terminal disclaimer.

(21) Appl. No.: 15/200,166

(22) Filed: Jul. 1, 2016

(65) Prior Publication Data
US 2016/0316406 A1 Oct. 27, 2016

Related U.S. Application Data

(63) Continuation of application No. 13/570,198, filed on Aug. 8, 2012, now Pat. No. 9,414,273.

(51) Int. Cl.
*H04W 36/00* (2009.01)
*H04W 84/04* (2009.01)
(Continued)

(52) U.S. Cl.
CPC ........... *H04W 36/04* (2013.01); *H04W 4/021* (2013.01); *H04W 12/08* (2013.01); *H04W 24/02* (2013.01);
(Continued)

(58) Field of Classification Search
CPC ..... H04W 36/05; H04W 36/04; H04W 36/30; H04W 72/0466; H04W 36/00;
(Continued)

(56) References Cited

U.S. PATENT DOCUMENTS 9,204,349 B2   12/2015 Nagaraja et al.
9,264,954 B2 * 2/2016 Radulescu ........ H04W 36/0083
(Continued)

OTHER PUBLICATIONS

Notice of Allowance for U.S. Appl. No. 13/570,198 dated Apr. 4, 2016, 31 pages.
(Continued)

*Primary Examiner* — Khawar Iqbal
(74) *Attorney, Agent, or Firm* — Amin, Turocy & Watson, LLP

(57) ABSTRACT

A system and methodology that facilitates macrocell-to-femtocell handovers during an on-going communication session by augmenting a neighbor list with femtocell data is provided. Moreover, the femtocell data associated with a set of femtocells that the a user equipment (UE) is authorized to access is added to a neighbor list. When a handover is initiated, the femtocell data is utilized to facilitate scanning of a radio environment of the user equipment to detect a target cell site for the handover. In one aspect, location data and/or serving cell data associated with the set of femtocells is utilized to limit the number of femtocells that are added to the neighbor list.

20 Claims, 17 Drawing Sheets

(51) Int. Cl.
*H04W 12/08* (2009.01)
*H04W 36/04* (2009.01)
*H04W 4/021* (2018.01)
*H04W 24/02* (2009.01)
*H04W 72/04* (2009.01)

(52) U.S. Cl.
CPC ... *H04W 36/0061* (2013.01); *H04W 72/0466* (2013.01); *H04W 36/00835* (2018.08); *H04W 84/045* (2013.01)

(58) Field of Classification Search
CPC ..... H04W 24/10; H04W 36/08; H04W 24/00; H04W 48/16; H04W 4/22; H04W 48/14; H04W 4/021; H04W 84/045; H04W 12/08; H04W 12/06; H04W 72/0473; H04W 72/561; H04W 52/383; H04W 24/08; H04W 52/16; H04W 52/365; H04W 4/005; H04W 72/12; G06Q 30/016; H04L 5/14; H04L 1/0003; H04B 17/24; H04B 17/318; H04B 17/382
USPC ...... 455/434, 435.1, 435.2, 444, 445, 452.2, 455/456.1
See application file for complete search history.

(56) References Cited

U.S. PATENT DOCUMENTS

| | | | |
|---|---|---|---|
| 9,277,468 B2* | 3/2016 | Nagaraja | H04W 24/02 |
| 9,288,699 B2 | 3/2016 | Beattie et al. | |
| 9,813,178 B2* | 11/2017 | Das | H04B 1/7107 |
| 2010/0041364 A1* | 2/2010 | Lott | G06Q 30/016 |
| | | | 455/404.1 |
| 2010/0113032 A1 | 5/2010 | Lee et al. | |
| 2010/0124179 A1 | 5/2010 | Lee et al. | |
| 2010/0130212 A1 | 5/2010 | So et al. | |
| 2010/0161794 A1 | 6/2010 | Horn | |
| 2010/0242103 A1 | 9/2010 | Richardson | |
| 2010/0260052 A1* | 10/2010 | Cho | H04W 48/16 |
| | | | 370/241 |
| 2011/0105129 A1 | 5/2011 | Kim et al. | |
| 2011/0237252 A1 | 9/2011 | Kim | |
| 2011/0287755 A1* | 11/2011 | Cho | H04W 52/0225 |
| | | | 455/418 |
| 2012/0015649 A1 | 1/2012 | Li | |
| 2012/0030734 A1 | 2/2012 | Wohlert | |
| 2012/0094663 A1* | 4/2012 | Awoniyi | H04W 48/16 |
| | | | 455/434 |
| 2012/0115496 A1 | 5/2012 | Soliman et al. | |
| 2012/0218075 A1 | 8/2012 | Hill | |
| 2012/0300686 A1* | 11/2012 | Maeda | H04W 52/0206 |
| | | | 370/311 |
| 2013/0005328 A1* | 1/2013 | De Benedittis | H04W 36/0055 |
| | | | 455/422.1 |
| 2013/0034081 A1 | 2/2013 | Ban et al. | |
| 2013/0045755 A1* | 2/2013 | Davis | H04W 56/006 |
| | | | 455/456.1 |
| 2013/0064182 A1 | 3/2013 | Zhu | |
| 2013/0136027 A1* | 5/2013 | Matsuo | H04W 24/10 |
| | | | 370/252 |
| 2013/0210385 A1 | 8/2013 | Ahmed | |
| 2013/0217385 A1* | 8/2013 | Das | H04W 48/16 |
| | | | 455/434 |
| 2013/0225165 A1 | 8/2013 | Das | |
| 2013/0288689 A1 | 10/2013 | Choi-Grogan et al. | |
| 2013/0303167 A1* | 11/2013 | Zhu | H04W 4/90 |
| | | | 455/436 |
| 2014/0038598 A1 | 2/2014 | Ren | |
| 2014/0099959 A1* | 4/2014 | Min | H04W 36/0083 |
| | | | 455/437 |
| 2014/0295796 A1 | 10/2014 | Fox | |
| 2015/0033021 A1 | 1/2015 | Tinnakornsrisuphap et al. | |
| 2015/0079937 A1* | 3/2015 | Adachi | H04W 12/06 |
| | | | 455/411 |
| 2015/0195057 A1* | 7/2015 | Tan | H04J 11/005 |
| | | | 370/252 |
| 2018/0146463 A1* | 5/2018 | Dinan | H04L 27/2649 |
| 2018/0270857 A1* | 9/2018 | Brisebois | H04W 16/28 |

OTHER PUBLICATIONS

Office Action for U.S. Appl. No. 13/570,198 dated Dec. 28, 2015, 23 pages.
Office Action for U.S. Appl. No. 13/570,198 dated Aug. 6, 2015, 22 pages.
Office Action for U.S. Appl. No. 13/570,198 dated Apr. 3, 2015, 23 pages.
Office Action for U.S. Appl. No. 13/570,198 dated Oct. 23, 2014, 16 pages.

* cited by examiner

INBOUND HANDOVER FOR MACROCELL-TO-FEMTOCELL CALL TRANSFER

CROSS REFERENCE TO RELATED APPLICATIONS

This application is a continuation of, and claims priority to, U.S. patent application Ser. No. 13/570,198, filed on Aug. 8, 2012, entitled "NON-PERSISTENT HETEROGENEOUS NEIGHBORS." The entirety of the foregoing listed application is hereby incorporated by reference herein.

TECHNICAL FIELD

The subject disclosure relates to wireless communications and, more particularly, to an inbound handover for a macrocell to femtocell call transfer.

BACKGROUND

Wireless service providers are observing an exponential growth in mobile communications due to both an increase in consumer demand and commercial requirements. To improve indoor wireless coverage, and to offload a mobility radio access network (RAN), wireless service providers are deploying femtocells-building-based wireless access points interfaced with a wired broadband network. Typically, femtocell coverage overlaps with extant macrocell coverage to ensure service continuity as subscriber(s) enters in and exits out of the subscriber(s) home coverage area or private indoor environment. A substantive number, e.g., $10^2$-$10^4$, of femtocells can reside within the coverage area of a single macrocell, thus creating a substantively complex handover situation for transitioning from macrocells to femtocells. In view of such high deployment density, handover from macrocell-to-femtocell can readily strain conventional neighbor-handling capabilities such as handover associations of macrocell networks and devices or other solutions for wireless indoor coverage.

DETAILED DESCRIPTION

Figure 1:
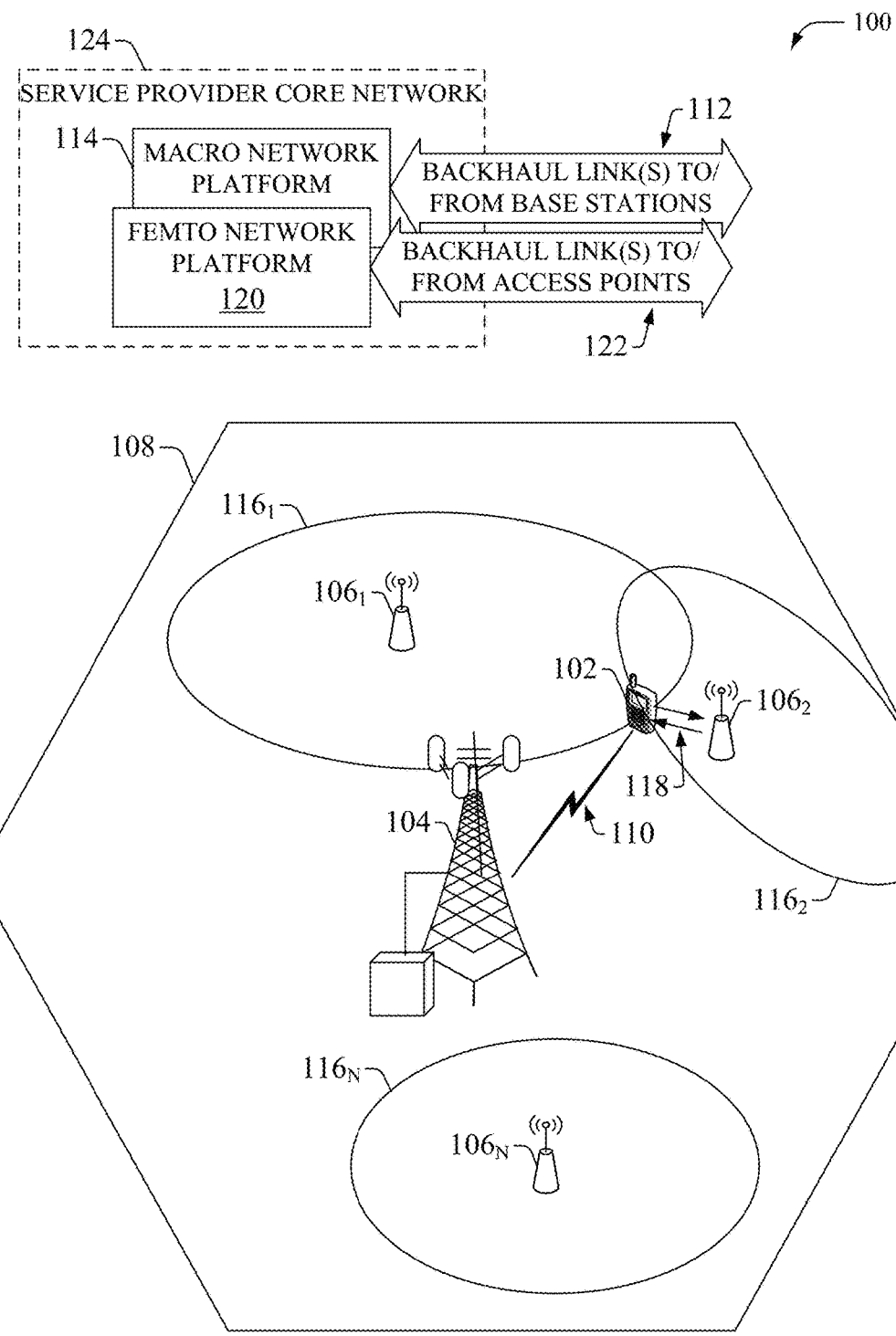
FIG. 1 illustrates an example system that facilitates a handover of a user equipment (UE) from a macrocell to a femtocell during a voice call.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "connector," "controller," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instructions, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the words "example" and "exemplary" are used herein to mean serving as an instance, or illustration. Any aspect or design described herein as "example" or "exemplary" is not necessarily to be construed as preferred or advantageous over other aspects or designs. Rather, use of the word example or exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms "femtocell", and "femto" are utilized interchangeably, while "macrocell" and "macro" are utilized interchangeably herein. The term "site" utilized herein refers to a cell site, for example, a location at which antennas (e.g., transmitter/receivers transceivers) and electronic communications equipment are placed. As an example, a cell site can typically include communications equipment to create a cell in a cellular network. The communications equipment can include an access point, a base station, a Node B, an evolved Node B, a home Node B (HNB), or the like.

Conventionally, when a handover is initiated, a serving macrocell provides a user equipment (UE) with a "neighbor list" that specifies a list of nearby cell sites that are to be scanned by the UE to find the best available signal. The neighbor list generated by the serving macrocell can include all the detected nearby femtocells (including femtocells that the UE is authorized to access and femtocells that the UE is not authorized to access), which therefore generates an unacceptably large amount of signaling traffic to the UE, and also burdens the UE with a needlessly long list of potential femtocell handover targets that it must scan. For this reason, conventionally femto cells are not included in the neighbor lists provided by macrocells, and thus the inbound handoff to a femto cell is not supported for on-going calls. During an on-going call, the resources of the UE that are available for signaling and/or scanning are limited and over-burdening the resources can result in a decrease in call quality and oftentimes dropped calls, leading to increased customer dissatisfaction.

The systems and methods disclosed herein facilitate inbound handovers from a macrocell to a femtocell during an on-going voice call. In one aspect, an identifier associated with a femtocell, which a user equipment (UE) is authorized to access, can be pre-stored within the UE and/or network server prior to initiation of the handover. During an inbound handover, the UE can utilize a neighbor list augmented with the identifier to facilitate a carrier frequency scan for detection of a target site. Since signaling traffic associated with receiving the neighbor list is not increased and the number of cell sites that need to be scanned by the UE in preparation for handover is increased by only a small amount (typically, just one), the quality of the voice call can be maintained during the handover and the risk of dropping the call can be mitigated.

In one aspect, the disclosed subject matter relates to a system comprising at least one memory that stores computer-executable instructions and at least one processor, communicatively coupled to the at least one memory, that facilitates execution of the computer-executable instructions. Moreover, the computer-executable instructions on execution determine, prior to an inbound handover of a user equipment from a macrocell to a femtocell, femtocell data associated with a set of femtocells that the user equipment is authorized to access. Further, the computer-executable instructions on execution augment a neighbor list with at least a portion of the femtocell data, wherein the neighbor list includes macrocell data related to a set of macrocells that are within a predefined distance from a macro base station serving the user equipment, and direct the augmented neighbor list to the user equipment to facilitate the inbound handover.

Another aspect of the disclosed subject matter relates to a method that includes determining, by a system comprising a processor, that a handover is to be initiated to transfer a communication session associated with a user equipment from a macro access point to a femto access point. Further, the method includes receiving, by the system, a neighbor list that is customized for the user equipment, wherein the neighbor list includes femtocell data associated with a set of femtocells that the user equipment is authorized to access, and detecting, by the system, the femto access point based in part on the neighbor list. Yet another aspect of the disclosed subject matter relates to a non-transitory computer-readable storage medium comprising computer-executable instructions that, in response to execution, cause a system, including at least one processor, to perform operations including customizing a neighbor list for a user equipment, including adding, to the neighbor list, femtocell data associated with a set of femtocells that the user equipment is authorized to access. In addition, the operations include directing the customized neighbor list to the user equipment to facilitate an inbound handover from a macro access point to a femto access point.

The following description and the annexed drawings set forth certain illustrative aspects of the specification. These aspects are indicative, however, of but a few of the various ways in which the principles of the specification may be employed. Other aspects and embodiments of the specification will become apparent from the following detailed description of the specification when considered in conjunction with the drawings.

Aspects of the various embodiments can be exploited in substantially any wireless communication technology; e.g., Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), or High Speed Packet Access (HSPA). Additionally, substantially all aspects of the subject embodiments can be exploited in legacy telecommunication technologies.

Referring initially to FIG. 1, there illustrated is an example system 100 that facilitates a handover of a user equipment (UE) 102 from a macrocell to a femtocell during a voice call, according to an aspect of the subject embodiments. The system 100 includes a wireless environment that can include a macrocell 108 associated with a base station 104. It is noted that although the macrocell 108 is illustrated as a hexagon; the macrocells disclosed herein can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, including UE 102. An over-the-air wireless link 110 provides such coverage, the wireless link 110 can comprise a downlink (DL) and an uplink (UL), and can utilize a predetermined band, licensed or unlicensed, of the radio frequency (RF) spectrum. As an example, UE 102 can include any communication device, such as, but not limited to, a cell phone, a tablet, a digital media player, a gaming console, a digital camera, a video recorder, a personal digital assistant (PDA), a personal computer, a laptop, etc. It is noted that a set of base stations, its associated electronics, circuitry or components, base stations control component(s), and wireless links operated in accordance to respective base stations in the set of base stations form a radio access network (RAN).

In an aspect, base station 104 can communicate via backhaul link(s) 112 with a macro network platform 114, for example, within a service provider's core network 124. The macro network platform 114 can control a set of base stations (e.g., including base station 104) that serve either respective cells or a number of sectors within such cells. As an example, backhaul link(s) 112 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link.

To improve indoor wireless coverage, and/or to offload the RAN, a set of femtocells $116_1$-$116_N$ (wherein N can be any positive integer) served by respective femto access points (FAPs) $106_1$-$106_N$ can be deployed within (completely or partially) the macrocell 108. It can be noted that services provided by the femtocells $116_1$-$116_N$ can be extended beyond indoor coverage enhancement; for example, the femtocells $116_1$-$116_N$ can be utilized in areas wherein macro coverage is not poor or weak. Typically, the femtocells $116_1$-$116_N$ can cover an area that can be determined, at least in part, by transmission power allocated to the respective FAPs $106_1$-$106_N$, path loss, shadowing, and so forth. As an example, the femto coverage area of the FAPs $106_1$-$106_N$ can at least partially overlap with the macro coverage area 108 of the base station 104.

In one aspect, FAPs $106_1$-$106_N$ can typically serve a few (for example, 1-5) authorized wireless devices (e.g., UE 102) via a wireless link (e.g., 118) which encompasses a downlink (DL) and an uplink (UL). A femto network platform 120 can control such service, in addition to mobility handover from macro-to-femto handover and vice versa, and registration and provisioning of the FAPs $106_1$-$106_N$. Control, or management, is facilitated by backhaul link(s) 122 that connect deployed FAPs $106_1$-$106_N$ with femto network platform 120. Backhaul link(s) 122 can be substantially similar to backhaul link(s) 112. Femto network platform 120 can include components, e.g., nodes, gateways, and interfaces, that facilitate packet-switched (PS) (e.g., internet protocol (IP)) traffic and signaling generation for networked telecommunication. In one aspect, FAPs $106_1$-$106_N$ facilitate communication between an authorized UE (e.g., UE 102) within the femtocell coverage area and the service provider's core network 124 via the backhaul link(s) 122. As an example, authorization of the UE can be based on an access control list(s) (e.g., whitelists, blacklists, etc.) configured by an authorized user (e.g., femtocell owner/subscriber) and/or service provider.

According to an embodiment, data that facilitates femtocell detection by the authorized UE can be pre-provisioned and stored within the UE 102 and/or a network data store (not shown). For example, if UE 102 is authorized to access FAP $106_2$, data associated with FAP $106_2$ (e.g., FAP identifier, scanning frequency, location data, etc.) can be transmitted to (e.g., when FAP $106_2$ is provisioned, installed, registered, etc.) and stored within the UE 102 and/or the network data store. The UE 102 and/or the network data store utilize the data to facilitate prompt detection of FAP $106_2$ and initiation of an inbound handover (e.g., a macrocell-to-femtocell handover). As an example, the UE 102 initiates an inbound handover on detecting that the macro signal carrier does not satisfy a signal quality criterion (e.g., macro signal quality falls below a predefined threshold).

During an active/busy mode of operation, for example, when the UE 102 is performing a voice call, the UE 102 has a limited amount of resources (and/or time) to search for and/or detect a target femtocell for handover (to avoid degrading the quality of the voice call).

In one aspect, the UE 102 can retrieve a "neighbor list" from the macro network platform 114 that identifies frequencies for nearby macrocell sites, which the UE 102 can scan to detect a target cell site and facilitate a macro-to-macro handover. In addition, the neighbor list can include a list of femtocells that the UE 102 is authorized to access. The list of femtocells can be identified based on data stored within the network data store. Since the neighbor list includes a small amount of additional data customized for the UE 102 (and does not includes data associated with nearby unauthorized femtocell sites), signaling traffic associated with delivery of the neighbor list during an on-going voice call is minimized, compared to having data associated with many unauthorized femtocells included in the neighbor list. Further, since the UE 102 does not search for unauthorized femtocells, the number of cell sites that need to be scanned by the UE 102 in preparation for handover is decreased. Alternatively, in another aspect, the UE 102 can employ the femtocell data stored within the UE 102 to search for an authorized femto access point (e.g., $116_2$). In this example scenario, the neighbor list received from the macro network platform 114 can only include data associated with neighboring macrocells and thus the signaling traffic associated with delivery of the neighbor list during an on-going voice call is reduced. Accordingly, inbound handovers (during an on-going call) can be efficiently performed by UE 102 without (or with minimal) modification of the cellular network infrastructure.

Figure 2:
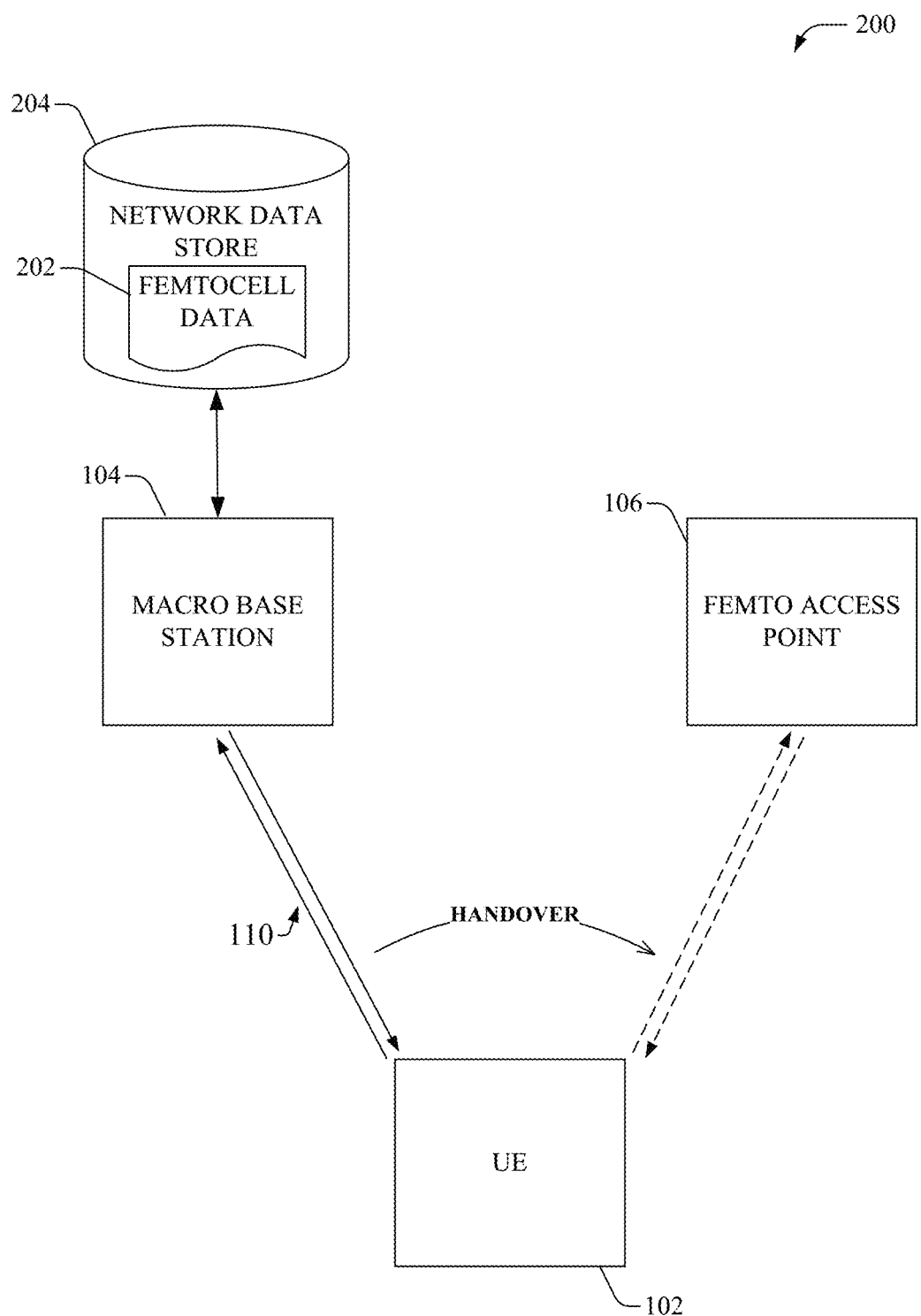
FIG. 2 illustrates an example system that enables a macro-to-femto handover based on a customized neighbor list.

Referring now to FIG. 2, there illustrated is an example system 200 that enables a macro-to-femto handover based on a customized neighbor list in accordance with an aspect of the subject disclosure. It can be noted that the UE 102 and the macro base station 104 can include functionality, as more fully described herein, for example, with regard to system 100. Further, the FAP 106 can be substantially similar to FAPs 106₁-106ₙ. In one aspect network data store 204 can be pre-provisioned (e.g., prior to initiating a macro-to-femto handover) with femtocell data 202 that facilitates detection of a FAP (e.g., FAP 106), which the UE 102 is authorized to access. As an example, the femtocell data 202 can include any data that facilitates detection of the FAP 106, such as, but not limited to a femtocell identifier (ID) (e.g., Physical Cell Identity (PCI)), a channel number, a frequency band, scrambling codes, security data, location of femtocell, etc. Additionally or optionally, femtocell data 202 can include any information that specifies when to scan for femtocells and/or how to scan for femtocell.

In one aspect, prior to the handover, the UE 102 is served by the macro base station 104 via a wireless link 110 to facilitate communication between the UE 102 and a core mobility network. The UE 102 can determine that a handover to a target cell is to be initiated based on various conditions. For example, the UE 102 can detect that a signal quality of a macro carrier signal has fallen below a predefined threshold and in response, initiate scanning the radio environment for a target cell. In response to the determination, the UE 102 can request from the macro base station 104, a neighbor list including data associated with a set of cell sites in the vicinity of (e.g., within a predefined distance from) the macro base station 104. In one aspect, the macro base station (and/or a network server (not shown)) can augment a neighbor list that includes a list of neighboring macrocell sites with at least a portion of the femtocell data 202 stored within the UE 102, and transmit the augmented neighbor list to the UE 102. Moreover, the UE 102 utilizes the augmented neighbor list to facilitate scanning for a target cell. As an example, UE 102 can scan its radio environment for carrier signals associated with the macrocells and the femtocells specified within the augmented neighbor list and select an optimal target cell site for handover (e.g., having highest carrier signal quality).

During an active/busy mode of operation, the UE 102 has limited resources and/or time to facilitate the scanning without degrading the quality of an on-going communication session. As disclosed herein an active/busy mode of operation includes a mode of operation of the UE 102, during which the UE 102 is performing a real-time communication session having a low-latency (e.g., below a predefined latency threshold) and/or high signal quality (e.g., above a predefined signal quality threshold) requirements. For example, the communication session can include a voice call, a video call, a streaming data session, a live content download, etc. having low tolerance thresholds for delay. Since the neighbor list is augmented with a small amount (e.g., one or two) of femtocells, the resources of UE 102 are not over-burdened during the active/busy mode and a target cell site can be quickly identified without degrading (or minimally degrading) the on-going communication session. In this example scenario, FAP 106 can be identified as the target cell site and a macro-to-femto handover can be facilitated during the on-going communication session. Subsequent to the handover, the communication session can be seamlessly resumed via the FAP 106. Typically, femtocell communication provides users with several advantages, such as (but not limited to) lower costs/bills, higher signal quality, etc. as compared to macrocell communications.

In addition, the signaling and scanning burden on the UE 102 can be further reduced by augmenting the neighbor list with only a portion of the femtocell data 202 that includes a subset of femtocells that are close to (e.g., within a predefined distance from) the UE 102. As an example, the macro base station 104 (and/or a network server) can generate an augmented neighbor list for a UE 102 that can customized based on a current location of the UE 102. Moreover, the femtocells listed in the femtocell data 202 can be linked with location data that facilitates scanning for the femtocells at respective locations and/or location ranges. For example, a current location of the UE 102 can be identified at the time of initiating the handover based on global positioning (GPS) data, triangulation data, etc. Based on an analysis of the location data, the macro base station 104 (and/or a network server) can determine a subset of the femtocells listed in the femtocell data 202 that satisfy a distance criterion (e.g., within a predefined distance from the UE 102), and can augment the neighbor list with only the subset of the femtocells to facilitate the handover. In another example, the femtocells listed in the femtocell data 202 can be linked with a set of macrocell identifiers (e.g., PCIs), such that the macro base station 104 (and/or a network server) can identify whether the macrocell identifier of the serving base station is included within the set of macrocell identifiers and can augment the neighbor list with only a subset of the femtocells associated with the serving base station to facilitate the handover. Accordingly, at different locations the UE 102 can be provided with a different augmented neighbor list.

In another aspect, the UE 102 can be pre-provisioned (e.g., prior to initiating a macro-to-femto handover) with the femtocell data 202 that facilitates detection of a FAP (e.g., FAP 106), which the UE is authorized to access and the UE 102 can augment the neighbor list received from the macro base station 104 with the femtocell data 202. Further, information regarding when to scan for specific femtocells listed in the femtocell data 202 can also be stored within the UE 102. Moreover, the femtocells listed in the femtocell data 202 can be linked with location data that facilitates scanning for the femtocells at respective locations and/or location ranges. For example, a current location of the UE 102 can be identified at the time of initiating the handover based on global positioning (GPS) data, triangulation data, etc. Based on an analysis of the location data, the UE 102 can determine a subset of the femtocells listed in the femtocell data 202 that are in its vicinity (e.g., within a predefined distance from the UE 102), and can augment the neighbor list with and scan for only the subset of the femtocells to facilitate the handover. In another example, the femtocells listed in the femtocell data 202 can be linked with a set of macrocell identifiers (e.g., PCIs), such that the UE 102 can identify whether the macrocell identifier of the serving base station is included within the set of macrocell identifiers and can augment the neighbor list with and scan for only a subset of the femtocells associated with the serving base station to facilitate the handover.

Figure 3A:
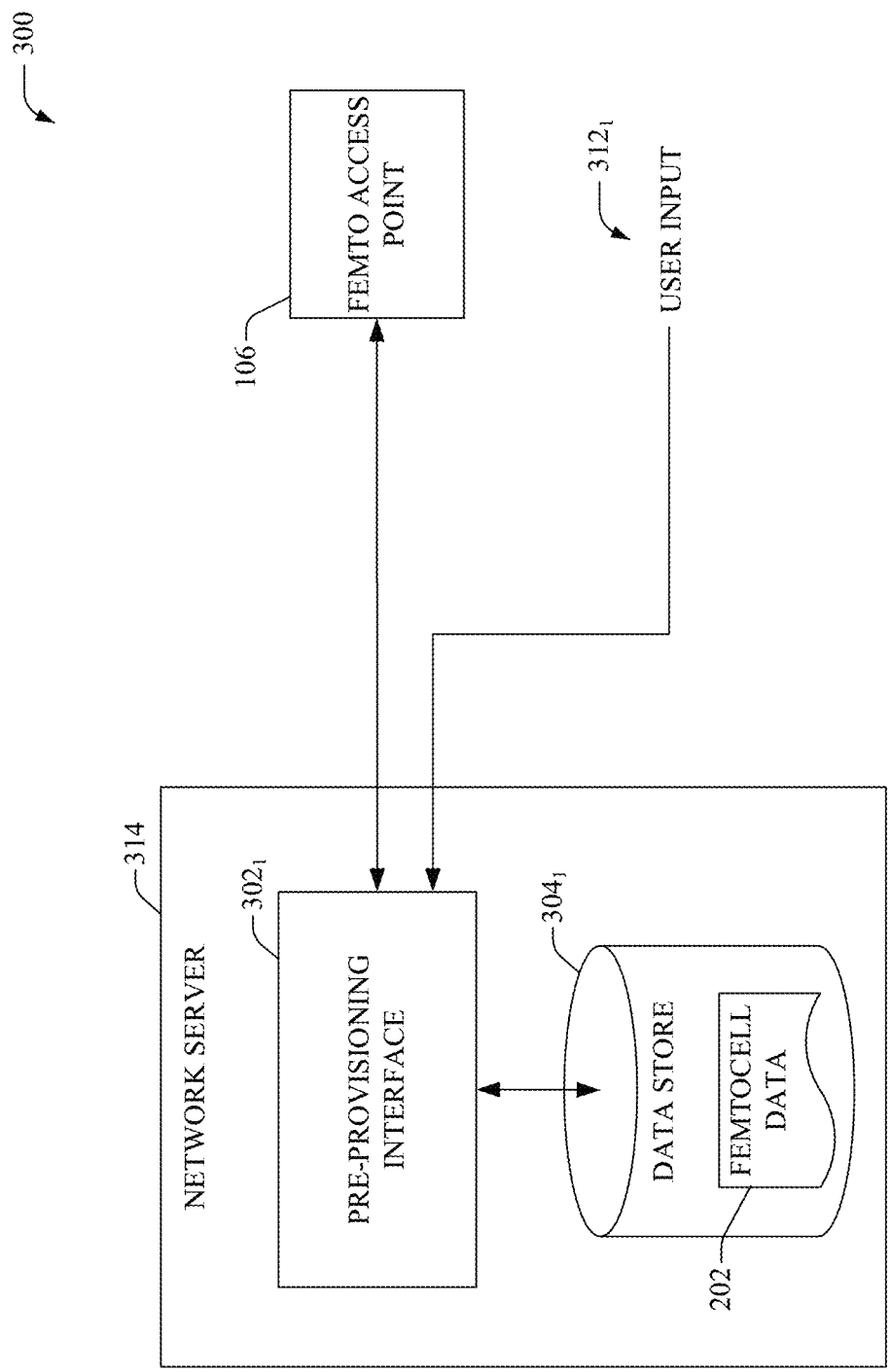
FIGS. 3A-3B illustrate example systems that pre-provision a network server and/or a UE with femtocell data to facilitate macro-to-femto handovers.

FIG. 3A illustrates an example system 300 that stores femtocell data 202 to facilitate macro-to-femto handovers, according to an aspect of the subject disclosure. In one aspect, the femtocell data 202 can be stored within a network server 314 within a telecommunication network. It can be appreciated that in one example, the network server 314 can (but is not limited to) reside within and/or be part of macro base station 104 and/or macro network platform 114. At least a portion of the femtocell data 202 can be utilized to augment a neighbor list transmitted by from a macro network during a handover. The FAP 106 can include functionality, as more fully described herein, for example, with regard to systems 100-200. Further, data store 304$_1$ can be substantially similar to network data store 204 and can include functionality, as more fully described herein, for example, with regard to system 200.

In one aspect, a pre-provisioning interface 302$_1$ can receive the femtocell data 202 and store the femtocell data 202 within a data store 304$_1$. As an example, the femtocell data 202 can be received at any time prior to initiation of a handover, such as, but not limited to, periodically, at a specified time, in response to an event (e.g., the UE 102 being added to an access list), during low network traffic, etc. Further, the pre-provisioning interface 302$_1$ can manage and/or edit the femtocell data 202 at any time.

According to an embodiment, access restrictions associated with FAP 106 can be configured, for example by populating an access control list associated with FAP (e.g., during installation, provisioning, registration, etc.). Functionality provided by FAP 106 to authorize, permanently or temporarily, or deny or revoke access to specific subscribers, or subscriber station(s), comprise what is herein termed as an access control list (e.g., white list(s) or black list(s))—an instrument for management of access to femtocell coverage. Typically, a white list can be populated with data identifying UEs that are authorized to access the FAP 106. In one aspect, subsequent to data identifying UE 102 being added to a white list associated with FAP 106, the pre-provisioning interface 302$_1$ can collect data related to the FAP 106 (e.g., femtocell ID, channel number, frequency range, location data, scrambling codes, security data, etc.). The pre-provisioning interface 302$_1$ can then store the received data within the data store 304$_1$ as part of the femtocell data 202 associated with the UE 102.

In yet another embodiment, as part of (or subsequent to) an initial authentication process to allow UE 102 to access the FAP 106, femtocell data 202 associated with the FAP 106 can be transmitted to the pre-provisioning interface 302$_1$. In this example scenario, FAP 106 is not limited to a restricted/private access point, but can also include an open/public access point. In still another embodiment, a network operator and/or customer support technician can manually enter the femtocell data 202. For example, user input 312$_1$ that includes at least a portion of the femtocell data 202 can be received by the pre-provisioning interface 302$_1$ via a user interface, via a message (e.g., text message) sent by another UE or communication device over a wired or wireless communication network (not shown). Although femtocell data 202 related to one UE (e.g., data associated with FAPs that the UE is authorized to access) is depicted in FIG. 3A, it can be noted that the subject disclosure is not so limited and that network server can store respective femtocell data associated with a plurality of UEs. Moreover, the femtocell data can be assigned with an identifier (e.g., MSISDN (Mobile Station International Subscriber Directory Number, International Mobile Subscriber Identity (IMSI), etc.) associated with a UE to facilitate a lookup during neighbor list augmentation for the UE.

Figure 3B:
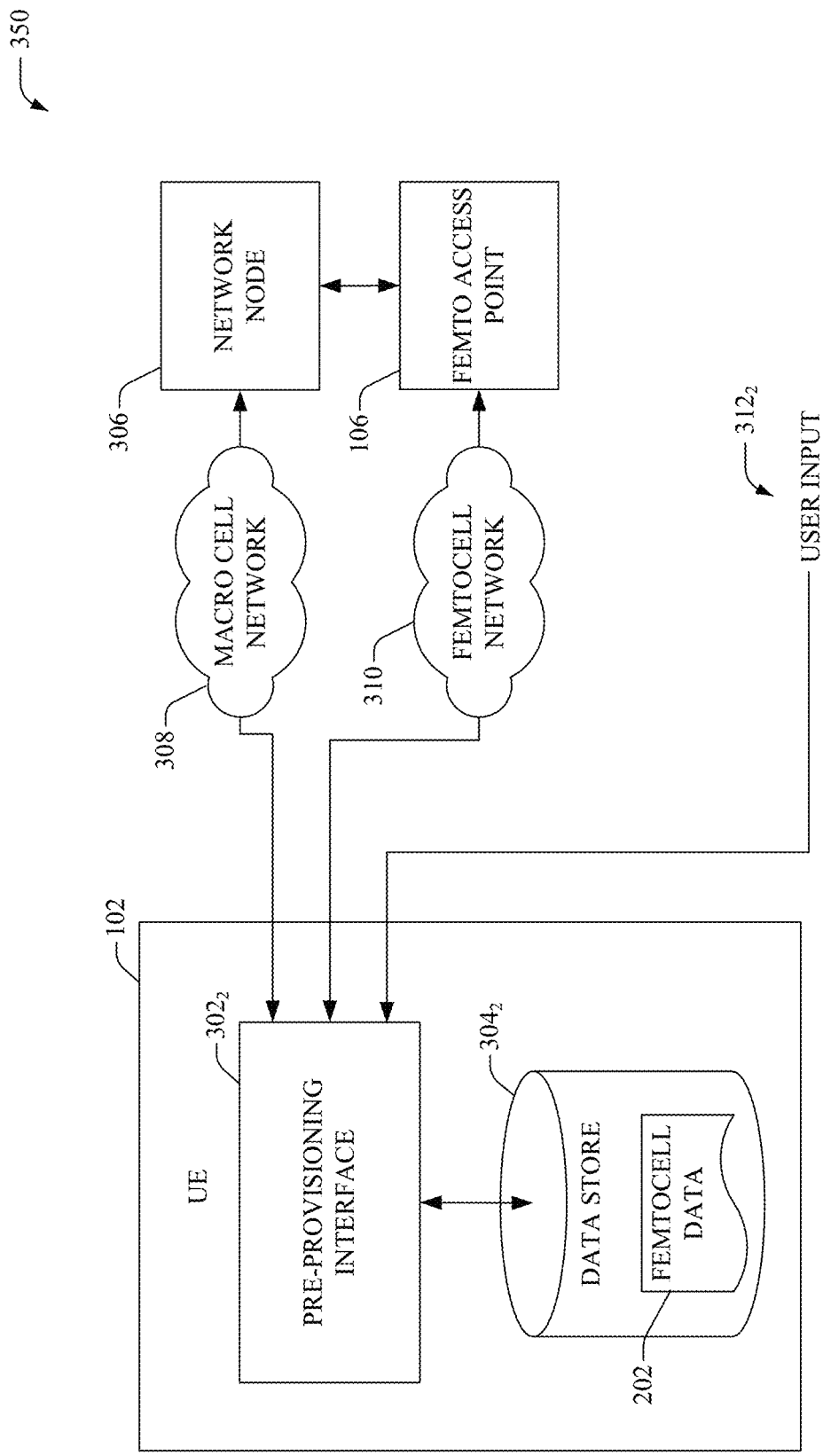

FIG. 3B illustrates an example system 350 that pre-provisions a UE 102 with femtocell data 202 to facilitate macro-to-femto handovers, according to an aspect of the subject disclosure. In one aspect, at least a portion of the femtocell data 202 can be utilized by the UE 102 to augment a neighbor list received from a macro network during a handover. UE 102 and the FAP 106 can include functionality, as more fully described herein, for example, with regard to systems 100-200.

In one aspect, UE 102 can include a pre-provisioning interface 302$_2$ that can receive the femtocell data 202 and store the femtocell data 202 within a data store 304$_2$. As an example, the femtocell data 202 can be received at any time prior to initiation of a handover, such as, but not limited to, periodically, at a specified time, in response to an event (e.g., the UE 102 being switched on), during an idle mode (e.g., when the UE 102 has sufficient resources available for reception of the femtocell data 202), etc. Further, the pre-provisioning interface 302$_2$ can manage and/or edit the femtocell data 202 at any time. In one aspect, subsequent to data identifying UE 102 being added to a white list associated with FAP 106, a network node 306 (e.g., a provisioning server) can collect data related to the FAP 106 (e.g., femtocell ID, channel number, frequency range, location data, scrambling codes, security data, etc.) and provide the data to pre-provisioning interface 302 via the macrocell network 308 (e.g., macro RAN). As an example, an over-the-air provisioning mechanism can be used to deliver the data to the pre-provisioning interface 302 such as, but not limited to Open Mobile Alliance-Data Management (OMA-DM), out-of band means, etc. In another embodiment, if the UE 102 is coupled to the femtocell network, the network node 306 and/or FAP 106 can provide the data to pre-provisioning interface 302 via the femtocell network 310 (e.g., femto RAN). The pre-provisioning interface can 302$_2$ store the received data within the data store 304 as part of the femtocell data 202.

In yet another embodiment, as part of (or subsequent to) an initial authentication process to allow UE 102 to access the FAP 106, femtocell data 202 associated with the FAP 106 can be transmitted to the pre-provisioning interface 302$_2$ via the femtocell network 310. In this example scenario, FAP 106 is not limited to a restricted/private access point, but can also include an open/public access point. In still another embodiment, a user, network operator and/or customer support technician can manually enter the femtocell data 202. For example, user input 312$_2$ that includes at least a portion of the femtocell data 202 can be received by the pre-provisioning interface 302 via a user interface on the UE 102, via a message (e.g., text message) sent by another UE or communication device over a wired or wireless communication network (not shown).

Although only one FAP is illustrated in FIGS. 3A-3B, it can be noted that the subject disclosure is not so limited and that the femtocell data 202 can include data associated with a plurality of FAPs. Further, in one example, the number of entries and/or amount of information stored within the femtocell data 202 can be limited based on a cost—benefit analysis (e.g., cost of storing the data and/or scanning for the femtocells during an active mode vs. the benefit of camping on an authorized femtocell and utilizing femtocell services). Furthermore, it is noted that the data stores 304$_1$ and 304$_2$ can include volatile memory(s) or nonvolatile memory(s), or can include both volatile and nonvolatile memory(s). Examples of suitable types of volatile and non-volatile memory are described below with reference to FIG. 14. The memory (e.g., data stores, databases) of the subject systems and methods is intended to include, without being limited to, these and any other suitable types of memory.

Figure 4:
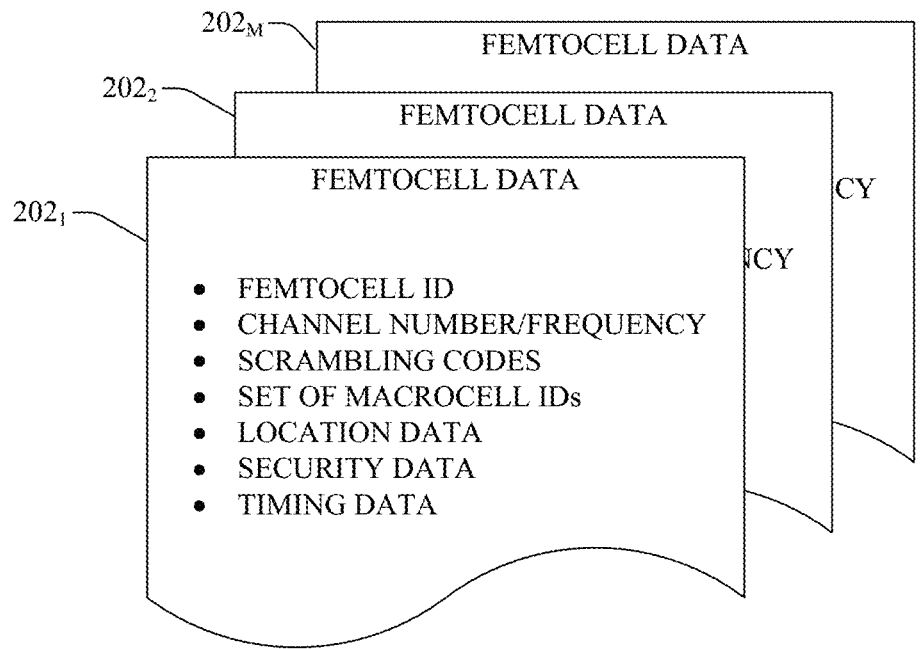
FIG. 4 illustrates femtocell data that can be utilized to facilitate an inbound handover.

FIG. 4 illustrates example femtocell data that can be utilized to facilitate an inbound handover, according to an aspect of the subject embodiments. In one aspect, a data store ($304_1$, $304_2$) can store, for a specified UE, femtocell data $202_1$-$202_M$ associated with M femtocells, wherein M can be any positive integer. It can be noted that the femtocell data $202_1$-$202_M$ can be substantially similar to femtocell data 202.

In one aspect, femtocell data $202_1$-$202_M$ can include any information that enables the UE 102 to search for and/or detect one or more femtocells during a handover. For example, the femtocell data $202_1$-$202_M$ can include a femtocell ID 402, a channel number or frequency range 404 which can be scanned by the UE 102, scrambling codes 406, a set of macrocell IDs 408 (e.g., that are near the FAP), location data 410 (e.g., geographical address/location of the femtocell, GPS co-ordinates, etc.), security data 412 (e.g., access restrictions and/or criterion), timing data 414 (e.g., a time period, during which the UE is authorized to access the femto access point), etc. Moreover, during a handover, UE 102 can utilize the femtocell data $202_1$-$202_M$ to scan for and detect a target cell site in addition to (or instead of) macrocell data received from a the macro network.

Figure 5A:
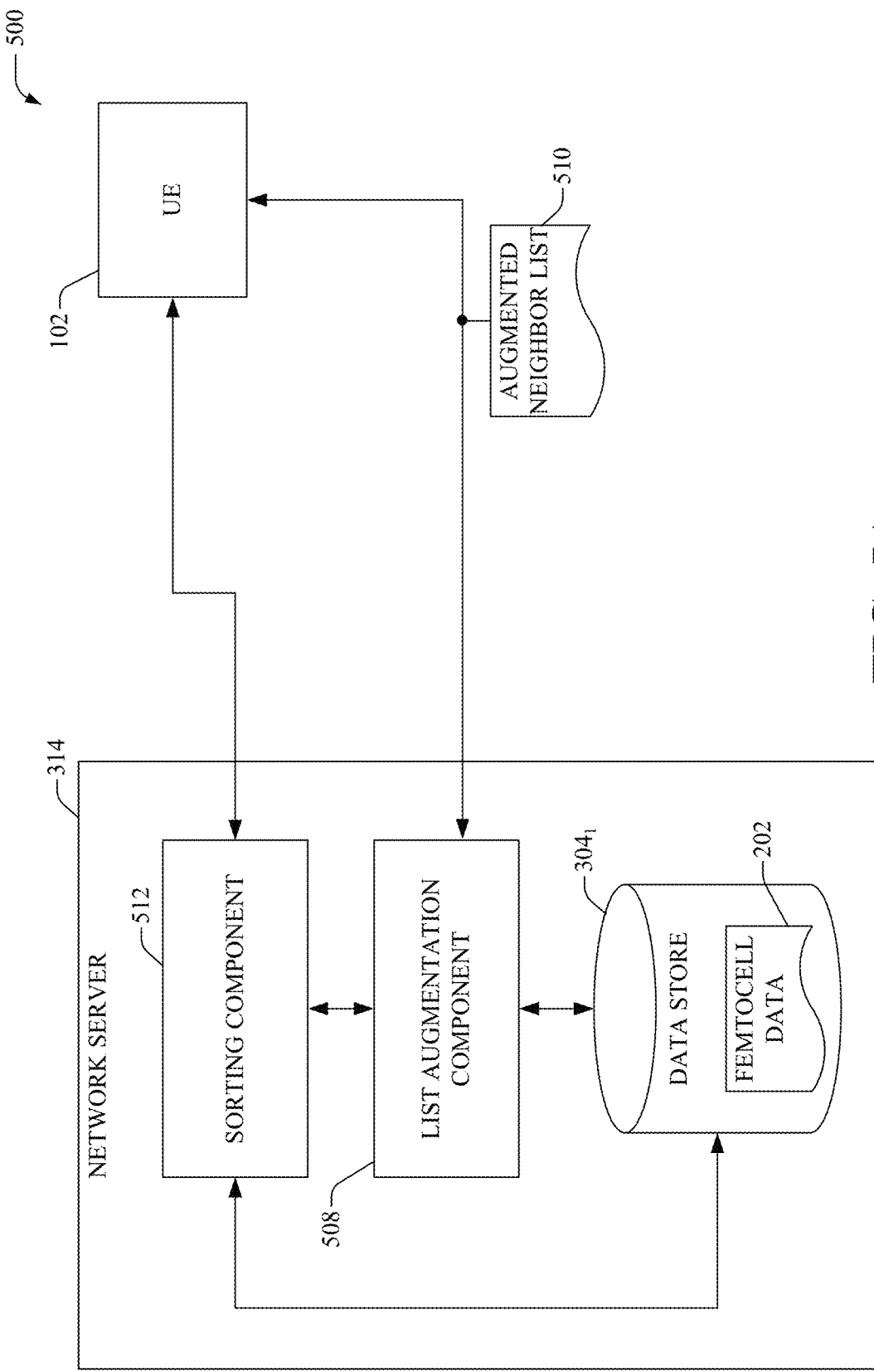
FIGS. 5A-5B illustrate example systems that generate and utilize an augmented neighbor list to perform an inbound handover from a macrocell to a femtocell.

Referring now to FIG. 5A there illustrated is an example system 500 that generates an augmented neighbor list to facilitate an inbound handover from a macrocell to a femtocell in accordance with an aspect of the subject disclosure. It can be noted that the UE 102, network server 314, FAP 106, femtocell data 202, and the data store $304_1$ can include functionality, as more fully described herein, for example, with regard to systems 100-400.

According to an embodiment, UE 102 can be served by macro base station 104 and can facilitate communication via the macrocell. Moreover, on determining that a handover is to be initiated from the macrocell to a target cell site, during an on-going communication session (e.g., voice call), the UE 102 can request for a neighbor list comprising a set of potential target cell sites. In response, the list augmentation component 508 can identify a list of femtocells, which the UE 102 is authorized access based in part on the femtocell data 202 associated with UE 102 (e.g., by performing a database lookup by employing an identifier associated with the UE 102). Further, the list augmentation component 508 can augment a neighbor list with the list of femtocells. As an example, the neighbor list provides macrocell data (e.g., macrocell IDs, frequency bands, etc.), that facilitates scanning of specific radio frequencies and detection of one or more macrocells to which the on-going communication session can be transferred. Furthermore, the list augmentation component 508 can transmit the augmented neighbor list 510 to the UE 102.

Additionally or optionally, a sorting component 512 can identify which femtocells within the list of femtocells are in the vicinity of the UE 102 (e.g., within a predefined distance from the UE 102) based in part on location data stored in the femtocell data 202 and the UE 102's current location (e.g., based on GPS data) and inhibit augmenting the neighbor list with data associated with the more distant femtocells that are listed in the femtocell data 202. In another example, since the femtocell IDs within the femtocell data 202 can be associated with a set of nearby macrocell IDs, sorting component 512 can filter out from the list of femtocells a set of femtocells that are not associated with a macro base station currently serving the UE 102. Since the neighbor list is augmented with a limited list (e.g., typically 1-2) of femtocells (instead of all the femtocells near the macro base station serving UE 102), the resources of UE 102 are not over-burdened during the receipt of the augmented neighbor list 510, and thus, the risk of degrading the quality of the on-going communication session and/or disconnecting/dropping the on-going communication session is mitigated.

Figure 5B:
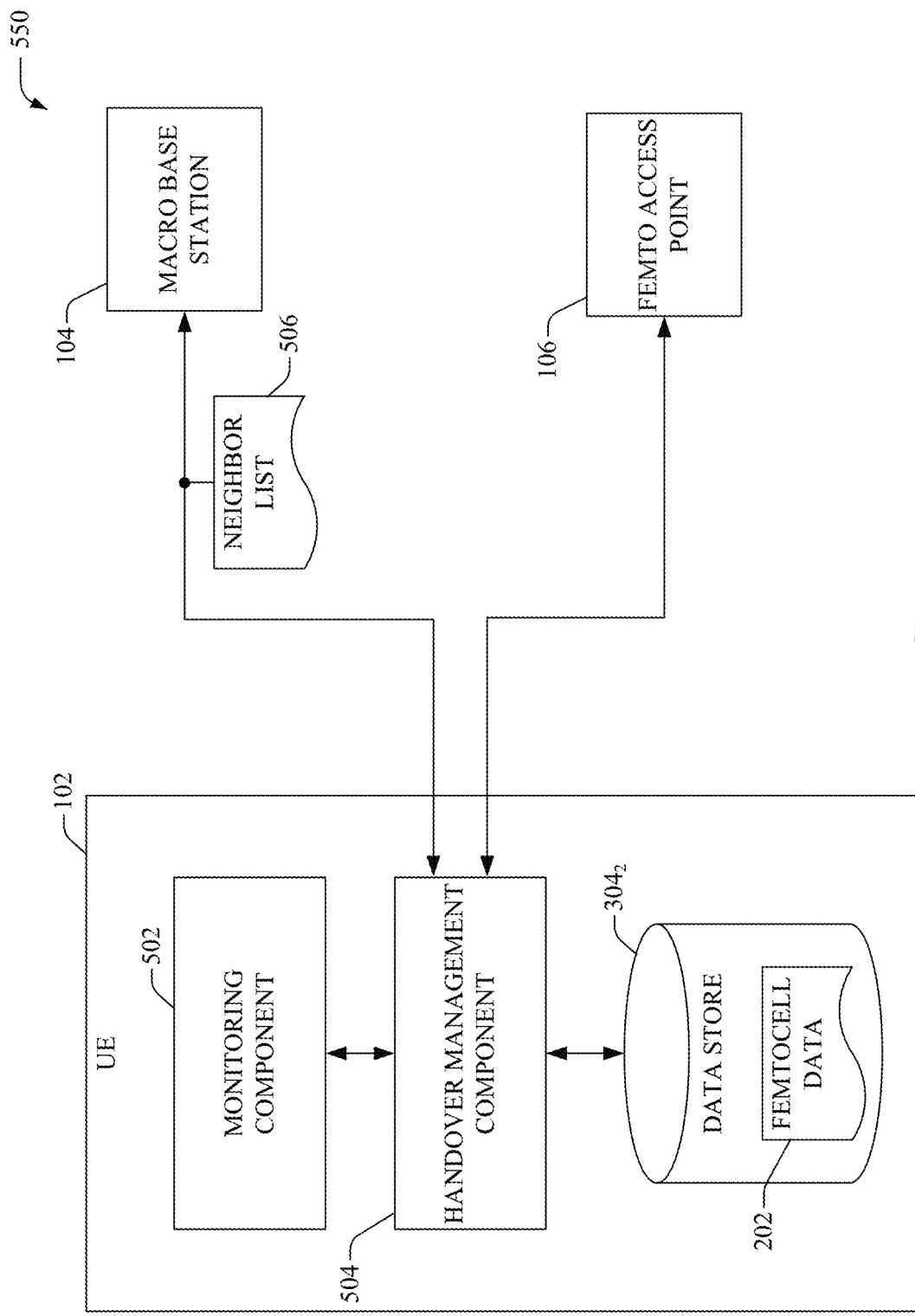

FIG. 5B illustrates an example system 550 that performs an inbound handover from a macrocell to a femtocell in accordance with an aspect of the subject disclosure. In one aspect, system 500 facilitates the inbound handover without modification of network infrastructure and/or software. It can be noted that the UE 102, macro base station 104, FAP 106, femtocell data 202, and the data store $304_2$ can include functionality, as more fully described herein, for example, with regard to systems 100-500.

According to an embodiment, UE 102 can be served by macro base station 104 and can facilitate communication via the macrocell. Moreover, UE 102 can include a monitoring component 502 that identifies whether a handover is to be initiated from the macrocell to a target cell site, during an on-going communication session (e.g., voice call). In one aspect, the monitoring component 502 can monitor various signal parameters, such as, but not limited to, signal strength of a macro carrier signal received from the macro base station 104. Moreover, the monitoring component 502 can analyze the signal strength, for example, by comparing the signal strength to a predefined threshold value. If the signal strength is greater than the predefined threshold value, it can be determined that the macro coverage is sufficient and/or reliable; however, if the signal strength is less than the predefined threshold value it can be determined that the macro coverage is poor/weak and that a handover to a target cell site is to be initiated. As an example, the predefined threshold value can specify minimum requirements, such as, but not limited to, signal strength, uplink and/or downlink rate, etc., below which communication would be unsatisfactory (e.g., poor call quality, slow downloads, and/or dropped calls) to a customer. In another example, monitoring component 502 can also initiate a handover on detecting a macrocell ID of a serving base station matches an ID stored within the femtocell data 202 as a macrocell that is near to a particular femto cell. In yet another example, monitoring component 502 can initiate a handover on detecting that the UE 102 is located within an area associated with a FAP, within a predefined distance from a FAP, and/or at a location associated with a FAP specified within the femtocell data 202.

On determining that a handover is to be performed (e.g., by the monitoring component 502), a handover management component 504 can search for a target cell site and perform the handover. In one aspect, the handover management component 504 can retrieve, from the macro base station 104, a neighbor list 506 that provides macrocell data (e.g., macrocell IDs, frequency bands, etc.), that facilitates scanning of specific radio frequencies and detection of one or more macrocells to which the on-going communication session can be transferred. In addition, the handover management component 504 can utilize the femtocell data 202 indicative of a set of radio frequencies that are to be scanned by the UE 102 to facilitate detection of one or more femtocells, to which the on-going communication session can be handed over. In one example, the handover management component 504 can identify which femtocells are in the vicinity of the UE (e.g., within a predefined distance from the UE 102) based in part on location data stored in the femtocell data 202 and the UE 102's current location (e.g., based on GPS data) and inhibit scanning the more distant femtocells that are listed in the femtocell data 202. In another example, since the femtocell IDs within the femtocell data 202 can be associated with a set of nearby macrocell IDs, the handover management component 504 can scan for a specific femtocell only if the ID of the serving macro base station 104 matches a macrocell ID associated with the femtocell. As an example, during the carrier frequency scanning, the handover management component 504 can monitor, measure, and/or compare various signal parameters (e.g., signal strength) associated with a set of carrier frequencies.

The handover management component 504 can analyze the results of the scanning to select a target cell site (femtocell or macrocell), for example, based on carrier signal strength, user preference (e.g., always connect to home femtocell), service provider policy, network congestion/traffic, etc. In this example scenario, FAP 106 can be selected and the handover management component 504 can perform any handover procedure to handoff the UE 102 from the macro base station 104 to the FAP 106. Since the UE 102 scans a limited list (e.g., typically 1-2) of femtocells identified by the femtocell data 202 (instead of all the femtocells near the macro base station 104), the resources of UE 102 are not over-burdened during the scanning/detection process, and thus, the risk of degrading the quality of the on-going communication session and/or disconnecting/dropping the on-going communication session is mitigated. Although inbound handovers are disclosed herein as to be performed during an on-going communication session, the subject specification is not so limited and that the femtocell data 202 can also be utilized to facilitate inbound handovers when the UE 102 is in an idle mode (e.g., to conserve battery life).

Figure 6:
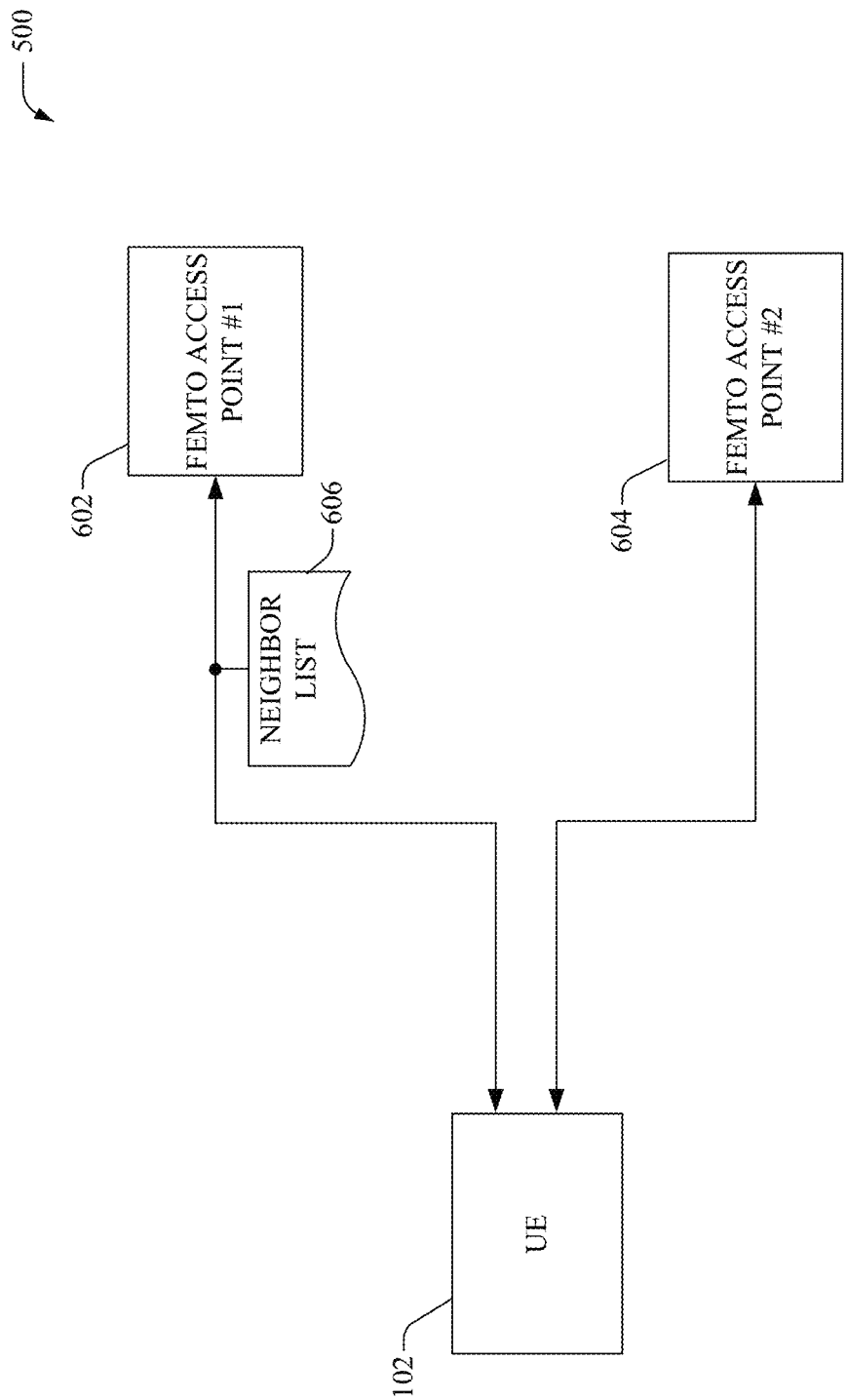
FIG. 6 illustrates an example system that performs a handover between femtocells in accordance with an aspect of the subject disclosure.

FIG. 6 illustrates an example system 600 that performs a handover between femtocells in accordance with an aspect of the subject disclosure. In one aspect, UE 102 can be coupled to a first FAP 602. For example, UE 102 can attempt to attach to the first FAP 602 through transmission and reception of attachment signaling (e.g., a Location Area Update (LAU) and/or Routing Area Update (RAU)). If UE 102 is authorized to connect to the first FAP 602, the UE 102 can camp on the first FAP 602 and facilitate communication via the first FAP 602. It can be noted that the UE 102 can include functionality, as more fully described herein, for example, with regard to systems 100-500.

According to an aspect, during an on-going communication session (e.g., voice call), the UE 102 (e.g. via monitoring component 502) can determine whether a handover criterion is satisfied. In one example, the handover criterion can include a signal parameter associated with a carrier signal transmitted by the first FAP 602 satisfying a threshold criterion (e.g., signal strength of the carrier signal falling below a predefined threshold value). In another example, the handover criterion can include a location, speed, motion, direction, and the like of the UE 102 satisfying respective threshold criteria. On determining that the handover criterion/criteria are satisfied, the UE 102 can initiate can search for a target cell site and perform the handover. In one aspect, the UE 102 can retrieve, from the first FAP 602, a neighbor list 606 that provides macrocell data (e.g., macrocell IDs, frequency bands, etc.) associated with macrocells surrounding or in the vicinity of the first FAP 602. As an example, the macrocell data includes information that facilitates scanning of specific radio frequencies and detection of one or more macrocells to which the on-going communication session can be transferred.

In one aspect, the neighbor list 606 can be augmented (e.g., by list augmentation component 514) with femto data indicative of a set of radio frequencies that can be scanned by the UE 102 to facilitate detection of one or more femtocells (e.g., second FAP 604) to which the on-going communication session can be handed over. Alternatively, the UE 102 can augment the received neighbor list 606 with the pre-provisioned femtocell data stored within the UE 102. As an example, the neighbor list 606 can be augmented (e.g., by list augmentation component 514 or handover management component 504) with a list of only those femtocells that are near the UE 102 (e.g., within a predefined distance from the UE 102) based in part on a location-based criterion. Moreover, the UE 102 can scan for a specific femtocell only if a current location of the UE (e.g., determined based on GPS co-ordinates) satisfies the location-based criterion and/or if the ID of the serving access point (e.g., first FAP 602) matches a cell ID stored within the femtocell data 202. As an example, the UE 102 (e.g., via handover management component 504) can analyze the results of the scanning to select a target cell site, for example, based on carrier signal strength, user preference (e.g., always connect to home femtocell), service provider policy, network congestion/traffic, etc. In this example scenario, the second FAP 604 can be selected and the UE 102 (e.g., via handover management component 504) can perform a femtocell-to-femtocell handover procedure to handoff the UE 102 from the first FAP 602 to the second FAP 604. Although the handover disclosed herein is performed during an on-going communication session, the subject specification is not so limited and the femtocell data 202 can also be utilized to facilitate femtocell-to-femtocell handovers when the UE 102 is operating in an idle mode.

Figure 7A:
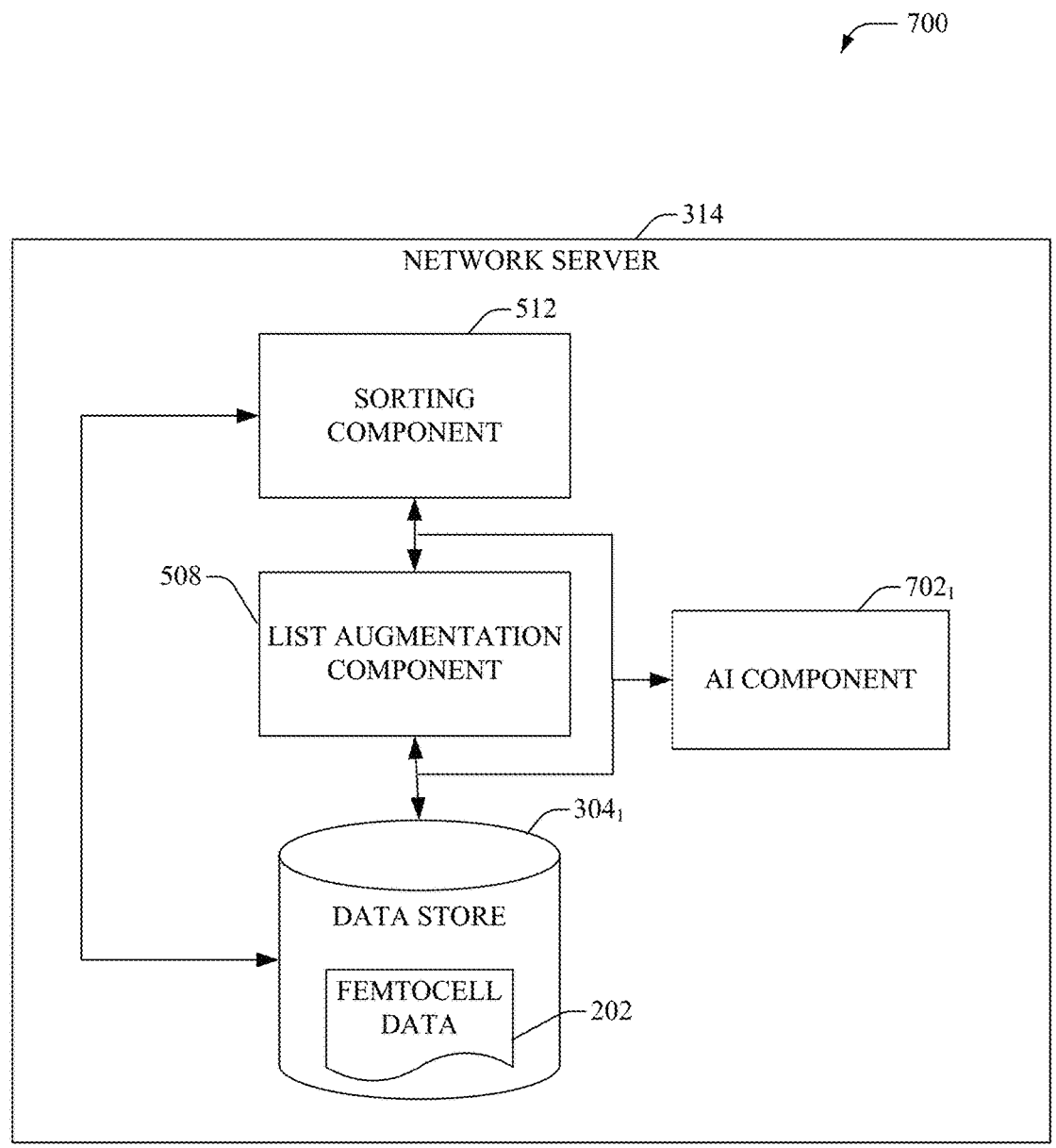
FIGS. 7A-B illustrate example systems that facilitate automating one or more features in accordance with an embodiment.
Figure 7B:
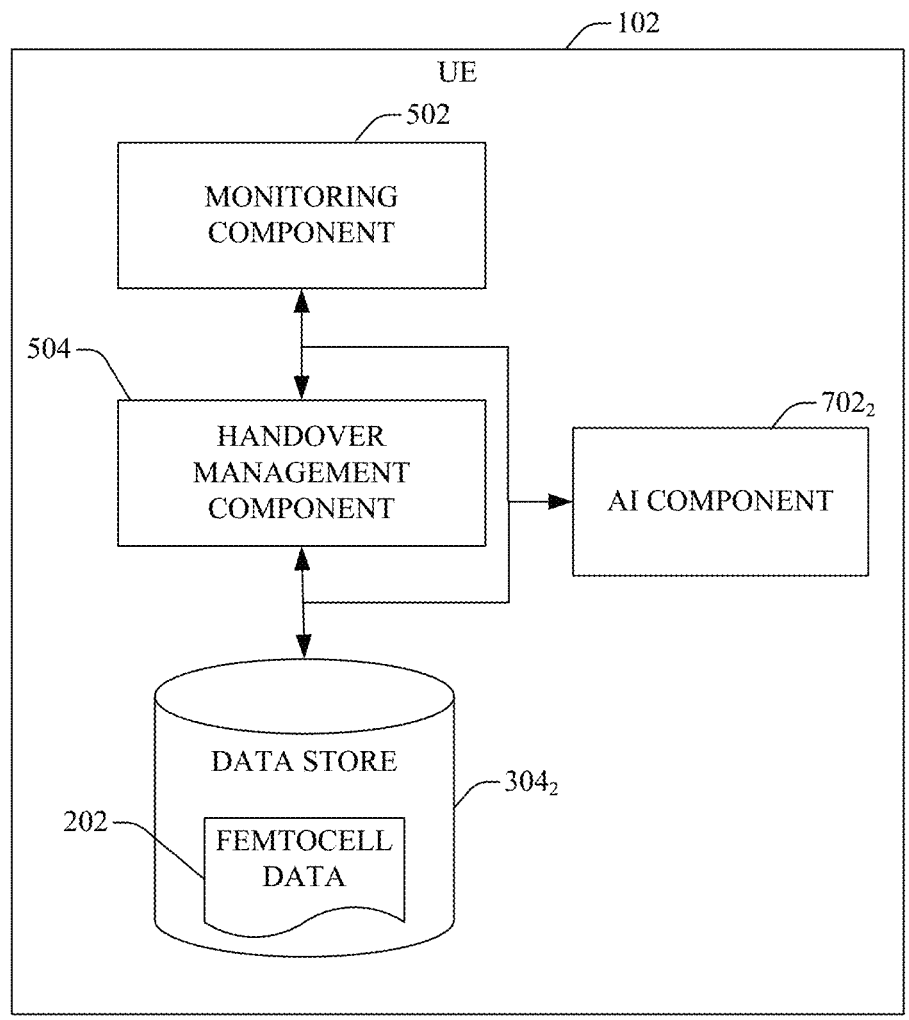

Referring now to FIGS. 7A-7B, there illustrated are example systems 700,750 that employ artificial intelligence (AI) components (702₁, 702₂), which facilitate automating one or more features in accordance with the subject embodiments. It can be appreciated that the network server 314, sorting component 512, list augmentation component 508, UE 102, femtocell data 202, data stores (304₁, 304₂), monitoring component 502, and handover management component 504 can include respective functionality, as more fully described herein, for example, with regard to systems 100-600.

The subject embodiments (e.g., in connection with automatically selecting a target cell site, identifying when a handover is to be initiated, populating/updating femtocell data 202, etc.) can employ various AI-based schemes for carrying out various aspects thereof. For example, a process for populating a neighbor list with a portion of the femtocell data 202, determining when and/or which frequencies are to be scanned on initiation of a handover process, identifying data (e.g., location data and/or serving cell ID) to be stored within the femtocell data 202, selecting a target cell site, etc., can be facilitated via an automatic classifier system and process. A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of communication systems, for example, attributes can be information stored in data store 304, and the classes can be categories or areas of interest (e.g., levels of priorities). A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject embodiments can employ classifiers that are explicitly trained (e.g., via a generic training data) as well as implicitly trained (e.g., via observing UE behavior, operator preferences, historical information, receiving extrinsic information). For example, SVM's are configured via a learning or training phase within a classifier constructor and feature selection module. Thus, the classifier(s) can be used to automatically learn and perform a number of functions, including but not limited to determining when a handover is to be initiated according to a configured criterion, which frequencies are to be added to a neighbor list and/or scanned during the handover, which of the frequencies are not to be added to the neighbor list and/or not to be scanned during the handover (e.g., to save time and resources), femtocell data 202 including location data and/or serving cell identification data, a target cell site to which the UE 102 is to be handed over, etc. The criterion can include, but is not limited to, historical patterns, UE behavior, user preferences, service provider preferences and/or policies, FAP parameters, location of the femtocell, location/direction/speed/motion of the UE 102, etc.

Figure 8:
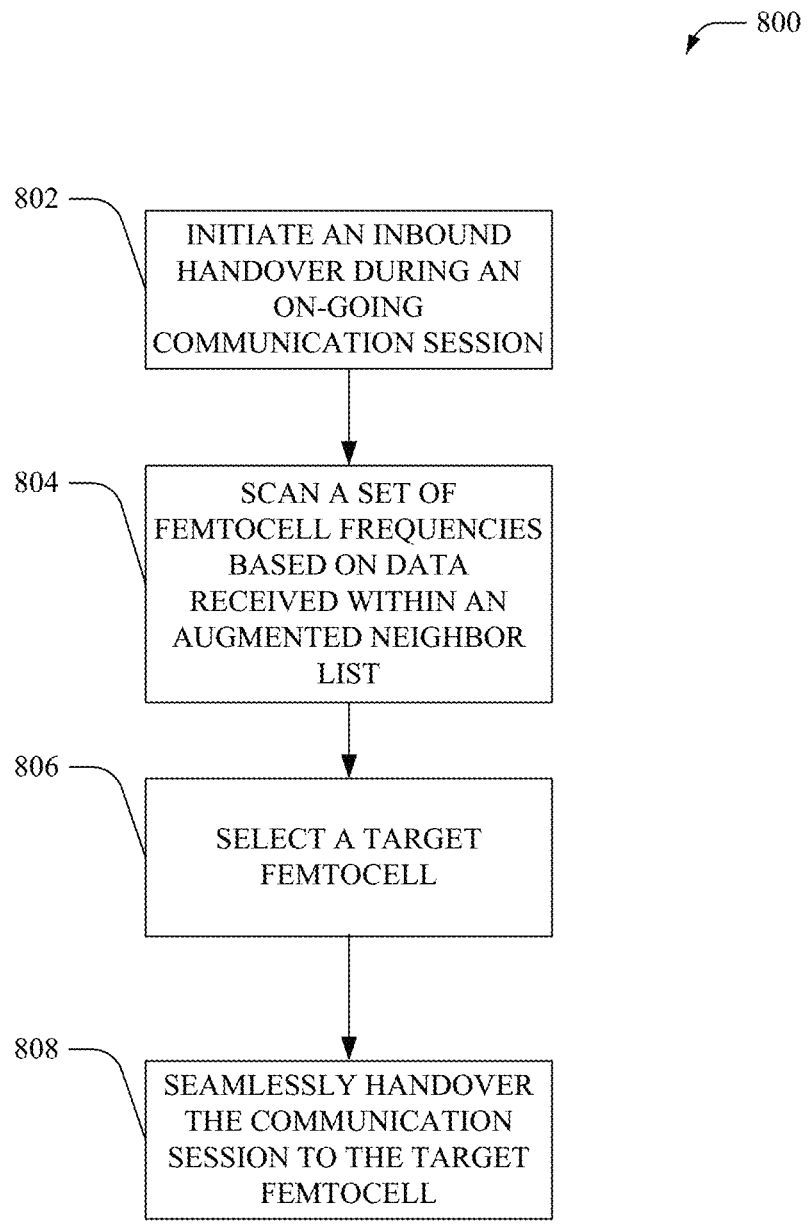
FIG. 8 illustrates an example methodology that can be utilized to facilitate an inbound handover during an on-going communication session.
Figure 9:
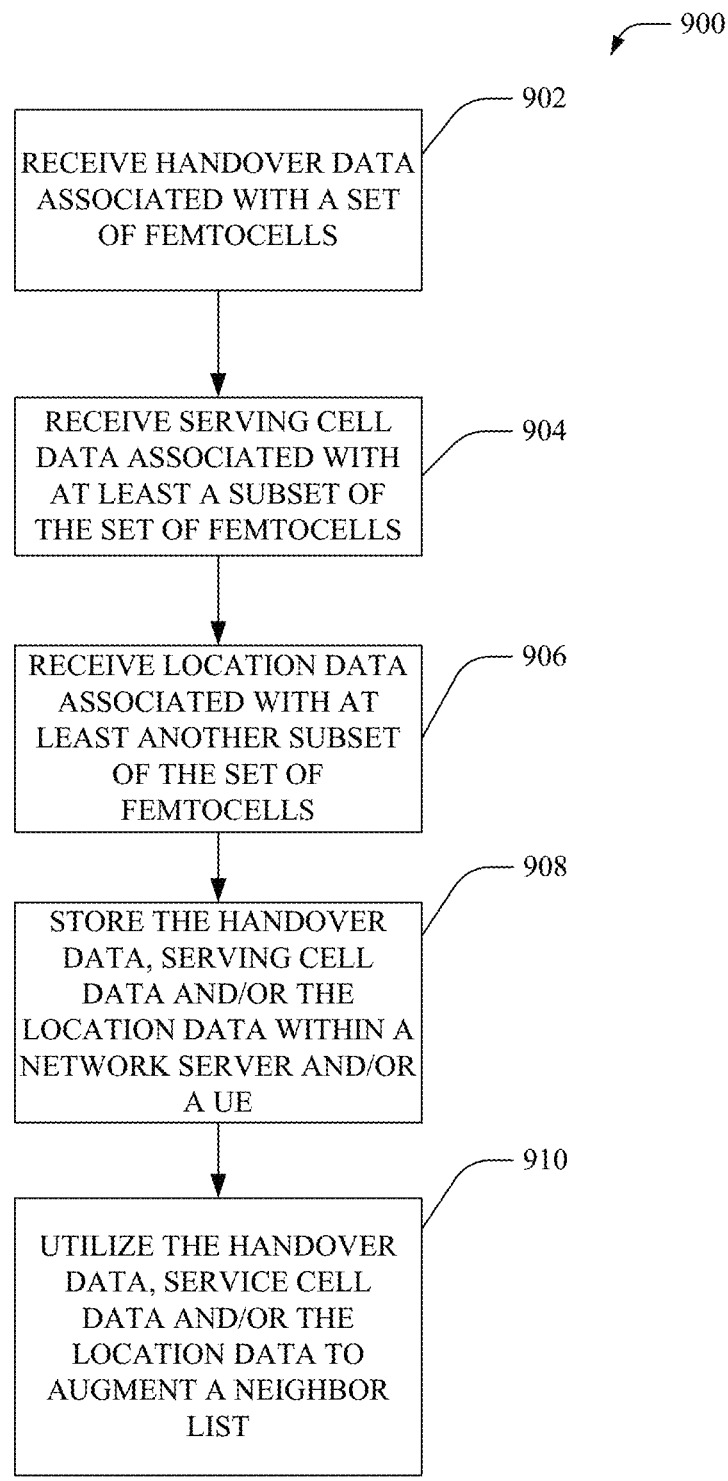
FIG. 9 illustrates an example methodology that facilitates provisioning a network server and/or a UE with femtocell data prior to initiation of a handover.
Figure 10:
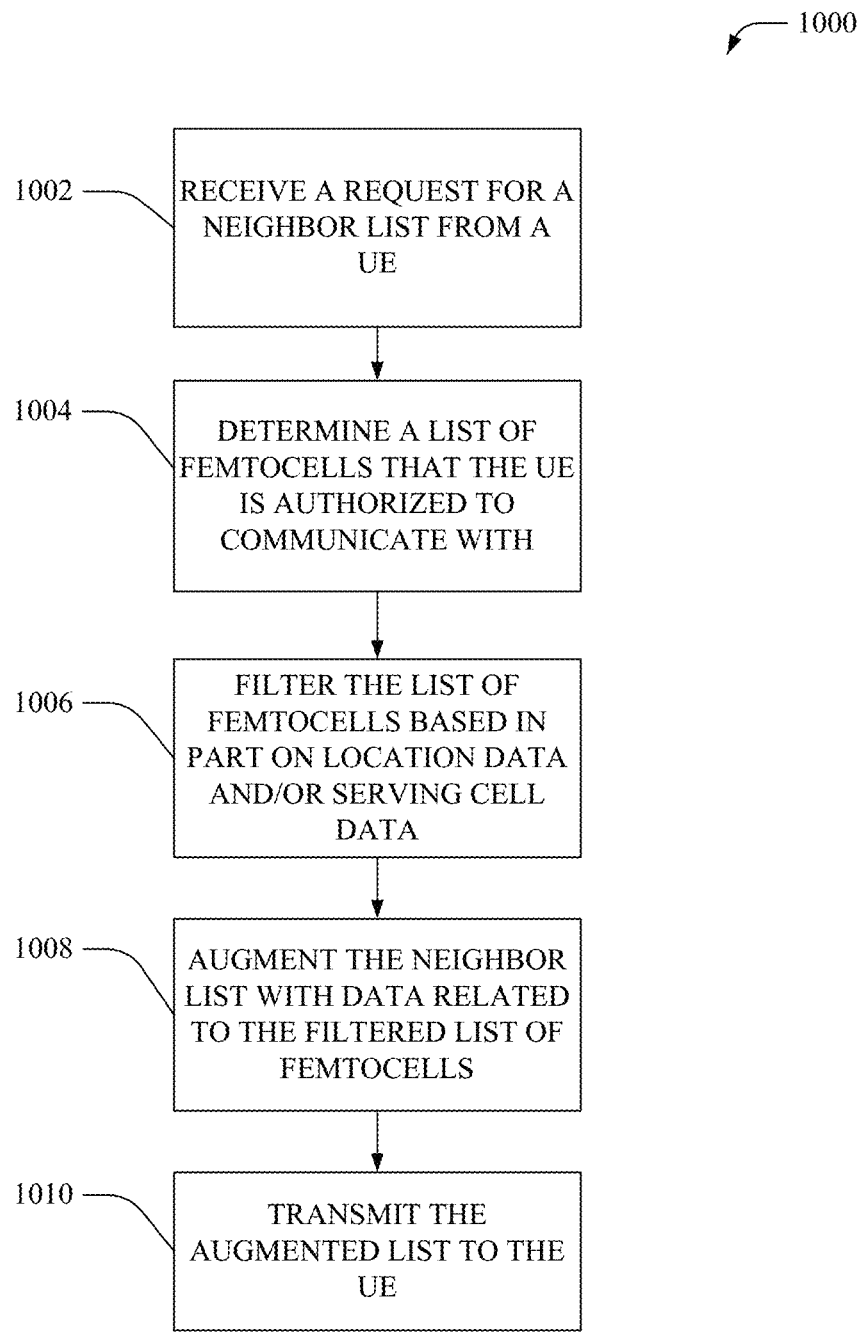
FIG. 10 illustrates an example methodology that utilizes pre-provisioned femtocell data to facilitate inbound handovers without degrading the quality of a communication session.

FIGS. 8-10 illustrate methodologies and/or flow diagrams in accordance with the disclosed subject matter. For simplicity of explanation, the methodologies are depicted and described as a series of acts. It is to be understood and appreciated that the subject embodiments is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram of events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

Referring now to FIG. 8, illustrated is an example methodology 800 that can be utilized to facilitate an inbound handover during an on-going communication session, according to an aspect of the subject specification. At 802, an inbound handover can be initiated during an on-going communication session (e.g., by the monitoring component 502). The communication session can be associated with a UE and can be performed via a serving base station (e.g., macro base station). As an example, the communication session can include, but is not limited to, a voice call, a streaming media session, a real-time content upload/download, a video call, etc. Moreover, the communication session can have a low-latency (e.g., below a predefined latency threshold) and/or high signal quality (e.g., above a predefined signal quality threshold) requirement. Accordingly, time and/or resources available to scan and detect a target cell site for a handover during the communication session are limited.

At 804, a set of femtocell frequencies can be scanned (e.g., by the handover management component 504) based on femtocell data received in an augmented neighbor list. Additionally or alternatively, femtocell data can be pre-stored data within the UE (e.g., by the handover management component 504). As an example, femtocell data can include femtocell IDs, femtocell frequencies, scrambling codes, etc. and can be associated with a set of femtocells that the UE is authorized to access. Additionally or optionally, the macrocell data (e.g., macrocell IDs, macrocell frequencies, etc.) associated with macrocells near/surrounding the serving base station received in the augmented neighbor list can also be utilize to scan a set of macrocell frequencies. At 806, a target femtocell (or macrocell) can be selected (e.g., by the handover management component 504), for example, based in part on an analysis of the result(s) of the scanning. Further, at 808, the communication session can be seamlessly handed over to the target femtocell (or macrocell).

FIG. 9 illustrates an example methodology 900 that facilitates provisioning a network server and/or a UE with femtocell data prior to initiation of a handover in accordance with an aspect of the subject specification. As an example, the network server and/or the UE can be provisioned at any time (prior to initiation of the handover), such as, but not limited to, when data associated with the UE is added to an access control list associated with a femtocell, periodically, on demand, etc. At 902, handover data associated with a set of femtocells is received (e.g., by the pre-provisioning interface). The set of femtocell includes femtocells that the UE is authorized to connect with. As an example, the handover data includes any data that facilitates detection of the femtocells, such as, but not limited to, a femtocell ID, a frequency range to be scanned, scrambling code(s), etc. In one aspect, the handover data can be received from a network node (e.g., from a provisioning server via a macrocell and/or femtocell network), the set of femto access points, an interface on the UE, and/or any device coupled to UE via a wired/wireless network.

At 904, serving cell data associated with at least a subset of the set of femtocells can be received (e.g., by the pre-provisioning interface). For example, serving cell data can include information that facilitates identification of one or more macrocells (or femtocells) near the subset of the set of femtocells. Moreover, on detecting the one or more macrocells (or femtocells), the UE can initiate a handover. Further, at 906, location data associated with at least another subset of the set of femtocells can be received (e.g., by the pre-provisioning interface). For example, location data can include, but is not limited to, a geographical address of a femtocell, GPS coordinates of the femtocell, an area (e.g., coverage area) near/around the femtocell, in which the femtocell can be detected, etc. In one aspect, when the UE is within the area and/or within a predefined distance from the geographical address/GPS coordinates, the UE can initiate a handover.

At 908, the handover data, serving cell data, and/or location data can be stored within the network server and/or the UE (e.g., by the pre-provisioning interface). It can be noted that the handover data, serving cell data, and/or location data can be updated and/or deleted at any time. Further, at 910, the handover data, serving cell data, and/or location data can be utilized to augment a neighbor list that facilitates a handover during a communication session (e.g., a voice call). Moreover, during the communication session, resources and/or time for performing a handover are limited. Accordingly, handover data, serving cell data, and/or location data can be utilized to facilitate handovers (e.g., inbound handovers) quickly and by employing the limited number of resources, without (or minimally) degrading the quality of the communication session.

FIG. 10 illustrates an example methodology 1000 that utilizes femtocell data to facilitate inbound handovers without degrading a quality of a communication session, according to an aspect of the subject disclosure. At 1002, a request for a neighbor list can be received from a UE (e.g., by the list augmentation component 508). As an example, the UE can request a neighbor list to facilitate a handover, for example, when signal strength associated with an access point serving the UE is below a predefined threshold. At 1004, a list of femtocells that the UE is authorized to communicate with can be determined (e.g., by the list augmentation component 508), for example, from a data store within a network server.

At 1006, the list of femtocells can be filtered (e.g., by the sorting component 512) based in part on location data and/or serving cell data that is stored within the data store. In one aspect, the location data and/or serving cell data can facilitate identifying a filtered list of femtocells near (e.g., within a predefined distance from) the UE. For example, the location data can include information identifying a location of the femtocells, and the serving cell data can include information identifying cell IDs of one or more macrocells (or femtocells) near (e.g., within a predefined distance from) the femtocells. During the communication session, a small number of resources are available for reception of a neighbor list and/or scanning and detection of target cell sites for a handover; filtering the list of femtocells can reduce the amount of data transmitted and/or the number of femtocell carriers that are to be scanned and thus, avoid over-burdening the UE resources.

At 1008, the neighbor list can be augmented with data related to the filtered list of femtocells (e.g., by the list augmentation component 508). Further, at 1010, the augmented neighbor list can be transmitted to the UE (e.g., by the list augmentation component 508). The UE can employ the augmented neighbor list to scan for and detect a target cell site to facilitate an inbound handover.

Figure 11:
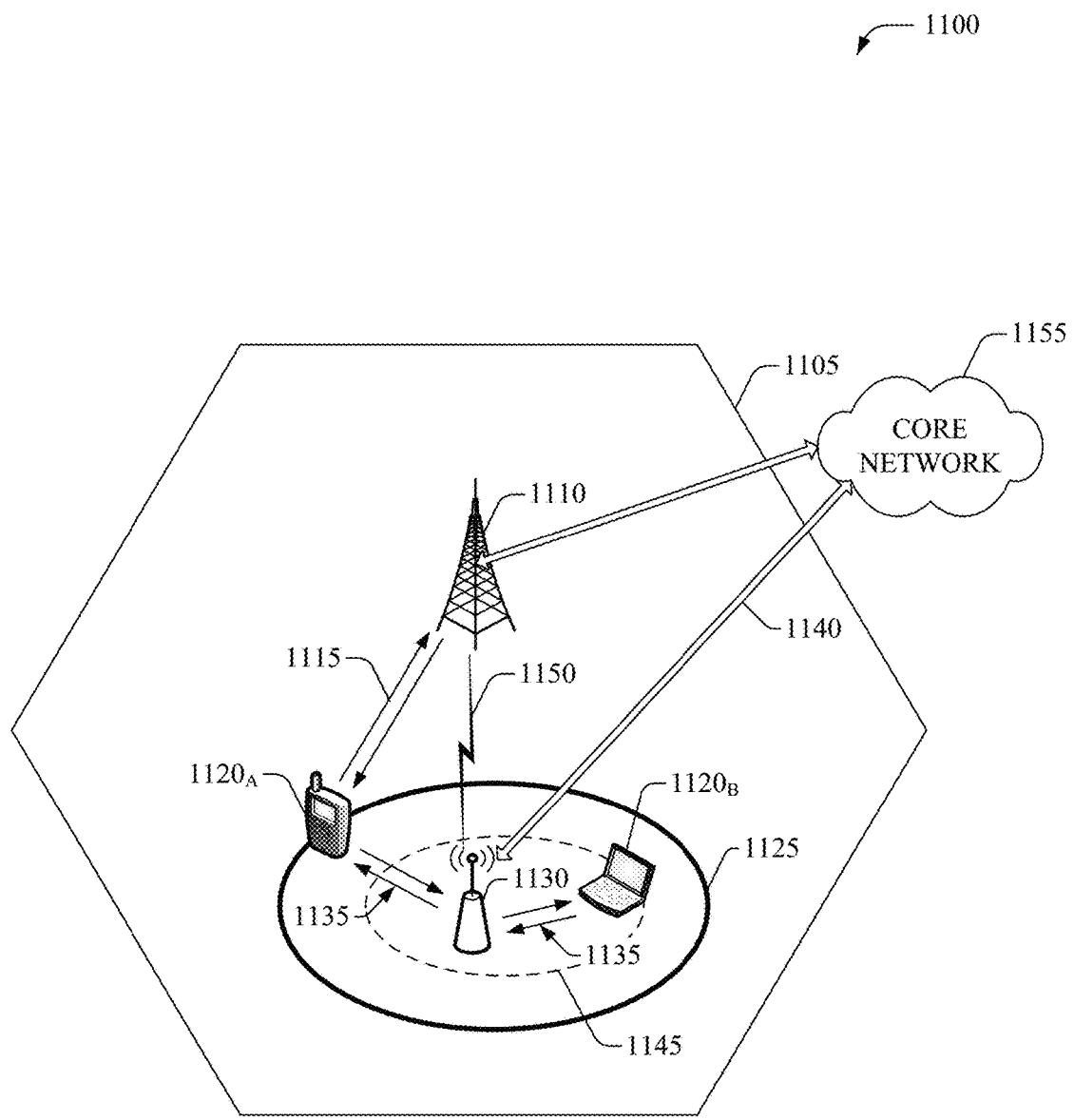
FIG. 11 illustrates an example wireless communication environment with associated components for operation of a UE during an inbound handover in accordance with the subject specification.

FIG. 11 illustrates a schematic wireless environment 1100 (e.g., a network) in which a UE can exploit various aspects of the subject embodiments in accordance with the disclosed subject matter. In wireless environment 1100, area 1105 can represent a coverage macrocell, which can be served by base station 1110. Macro coverage is generally intended for outdoor locations for servicing mobile wireless devices, like UE $1120_A$, and such coverage is achieved via a wireless link 1115. In an aspect, UE 1120 can be a 3GPP Universal Mobile Telecommunication System (UMTS) and/or Long Term Evolution (LTE) mobile phone. Moreover, UE 1120 can be substantially similar to UE 102 and can include respective functionality, as more fully described herein, for example, with regard to systems 100-700. Further, base station 1110 and FAP 1130 can be substantially similar to macro base station 104 and FAP 106 respectively and can include respective functionality, as more fully described herein, for example, with regard to systems 100-700.

Within macro coverage cell 1105, a femtocell 1145, served by a FAP 1130, can be deployed. A femtocell typically can cover an area 1125 that is determined, at least in part, by transmission power allocated to FAP 1130, path loss, shadowing, and so forth. Coverage area typically can be spanned by a coverage radius that ranges from 20 to 50 meters. Confined coverage area 1145 is generally associated with an indoors area, or a building, which can span about 5000 sq. ft. Generally, FAP 1130 typically can service a number (e.g., a few or more) wireless devices (e.g., subscriber station $1120_B$) within confined coverage area 1145. In an aspect, FAP 1130 can integrate seamlessly with substantially any PS-based and CS-based network; for instance, FAP 1130 can integrate into an existing 3GPP Core via conventional interfaces like Iu-CS, Iu-PS, Gi, Gn. In another aspect, FAP 1130 can exploit high-speed downlink packet access in order to accomplish substantive bitrates. In yet another aspect, FAP 1130 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

In one aspect, during a communication session performed by a subscriber station, e.g., UE $1120_A$, via the base station 1110, the UE $1120_A$ can identify that a handover condition has been satisfied (e.g., signal parameters associated with wireless link 1115 fall below a predefined threshold, UE $1120_A$ enters femtocell coverage (e.g., area 1125), etc.) and in response, a carrier frequency scan can be triggered by the UE $1120_A$. In one aspect, data indicative of the carrier frequency to be scanned can be provided to the UE $1120_A$ via an augmented neighbor list. Alternatively, data indicative of the carrier frequency to be scanned can be stored within the UE $1120_A$, for example, prior to the handover being initiated. As an example, the carrier frequency scan can facilitate detection of the FAP 1130 and UE $1120_A$ can attempt to attach to the FAP 1130 through transmission and reception of attachment signaling, effected via a FL/RL 1135; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 1120 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes FAP 1130) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if not successful, UE 1120 generally can be commanded (through a variety of communication means) to select another LAC/RAC or enter "emergency calls only" mode. It is to be noted that this attempt and handling process can occupy significant UE battery, and FAP capacity and signaling resources as well.

When an attachment attempt is successful, UE 1120 can be allowed on femtocell 1125 and the communication session can be seamlessly continued through the FAP 1130. It is to be noted also that data traffic is typically routed through a backhaul broadband wired network backbone 1140 (e.g., optical fiber backbone, twisted-pair line, T1/E1 phone line, DSL, or coaxial cable). It is to be noted that as a FAP 1130 generally can rely on a backhaul network backbone 1140 for routing and paging, and for packet communication, substantially any quality of service can handle heterogeneous packetized traffic. Namely, packet flows established for wireless communication devices (e.g., terminals $1120_A$ and $1120_B$)

served by FAP 1130, and for devices served through the backhaul network link 1140. It is to be noted that to ensure a positive subscriber experience, or perception, it is desirable for FAP 1130 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femtocell coverage area (e.g., area 1125 or area 1145).

Figure 12:
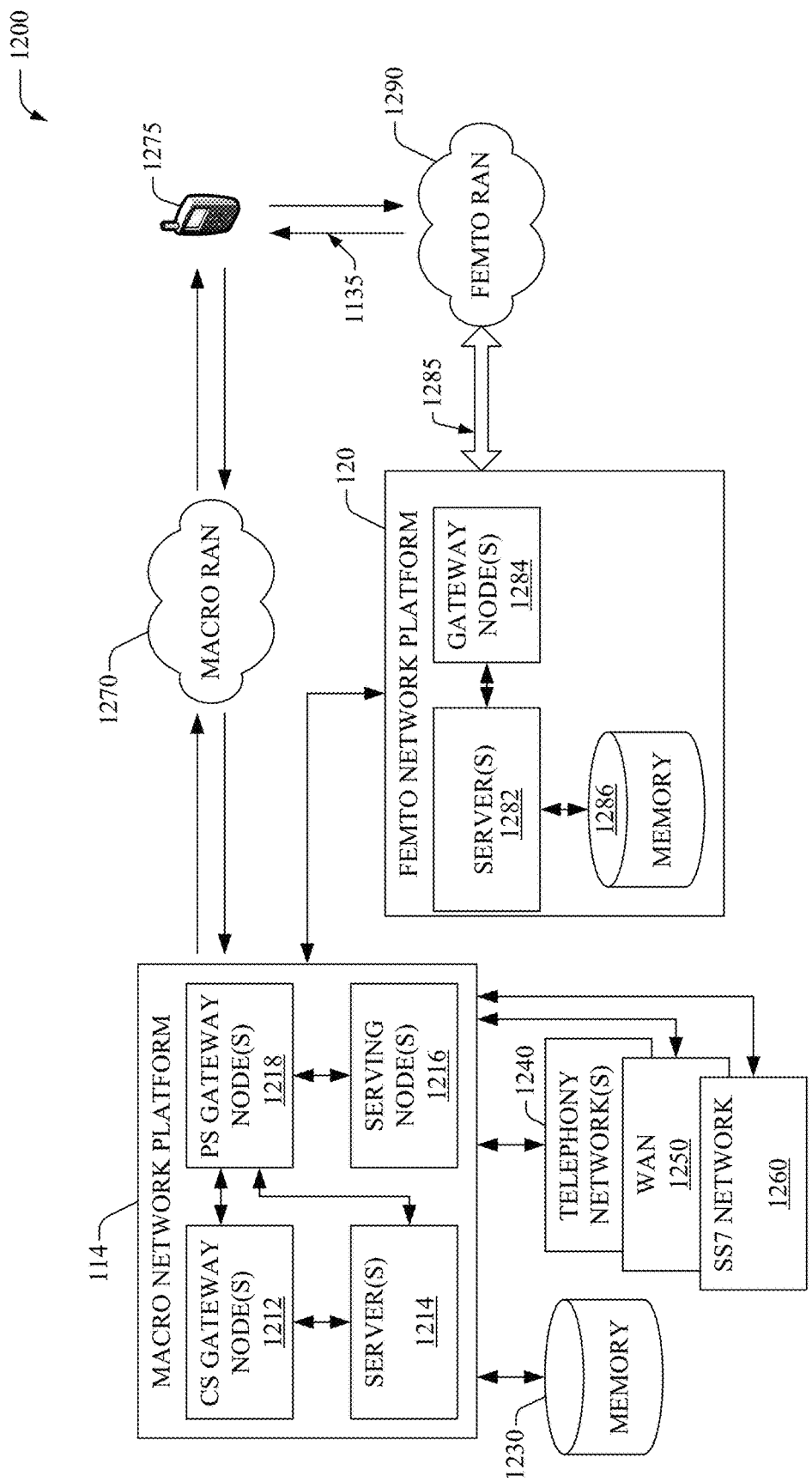
FIG. 12 illustrates a schematic deployment of a macrocell and a femtocell for wireless coverage in accordance with aspects of the disclosure.
Figure 13:
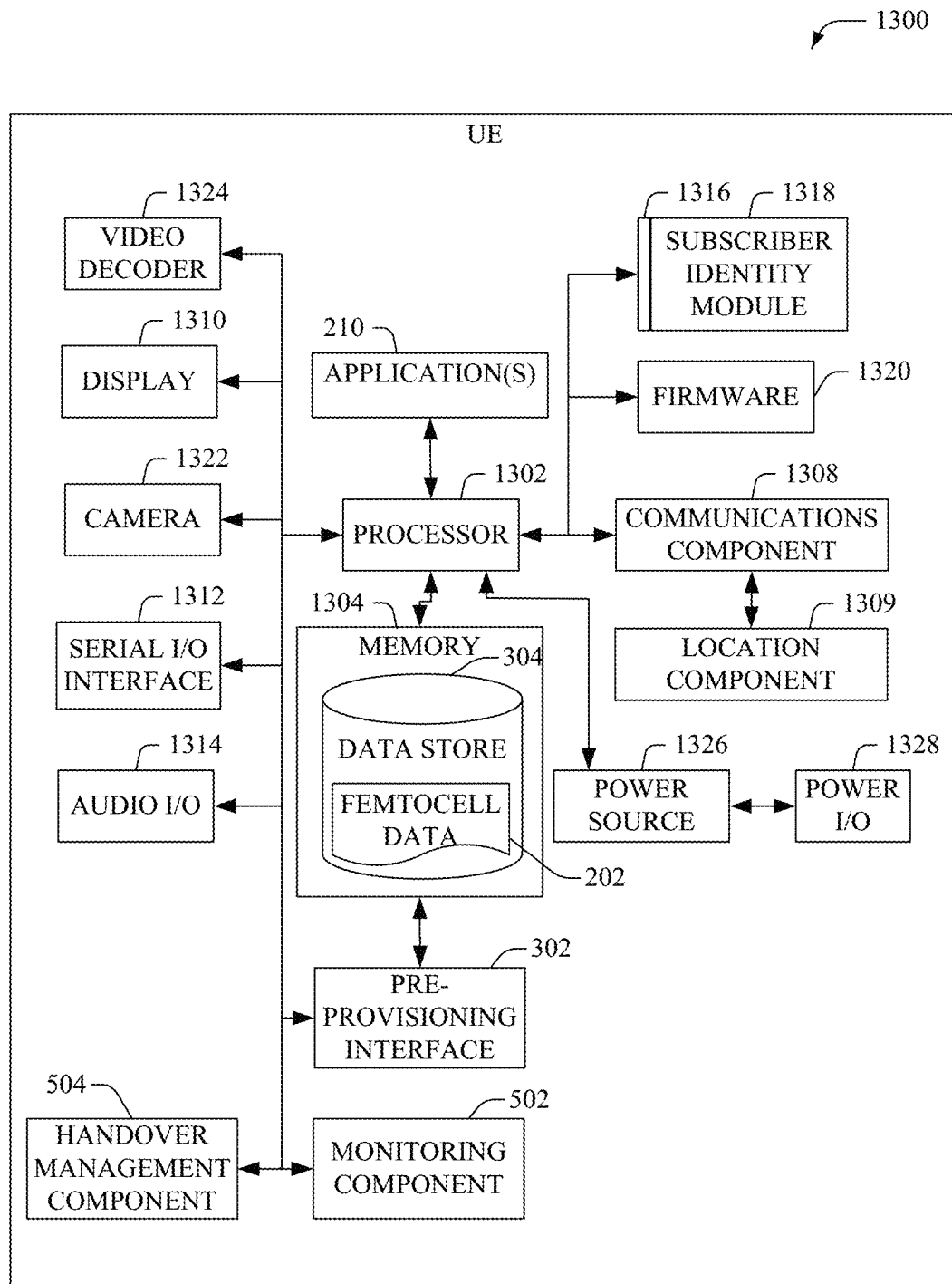
FIG. 13 illustrates an example block diagram of a UE suitable for utilizing augmented neighbor lists to facilitate inbound handovers.

To provide further context for various aspects of the subject specification, FIGS. 12 and 13 illustrate, respectively, an example wireless communication environment 1200, with associated components for operation of a femtocell, and a block diagram of an example embodiment 1300 of a UE, which can facilitate handovers by utilizing augmented neighbor lists in accordance with aspects described herein.

Wireless communication environment 1200 includes two wireless network platforms: (i) A macro network platform 114 that serves, or facilitates communication) with user equipment 1275 via a macro radio access network (RAN) 1270. It should be appreciated that in cellular wireless technologies (e.g., 3GPP UMTS, HSPA, 3GPP LTE, 3GPP UMB), macro network platform 114 is embodied in a Core Network. (ii) A femto network platform 120, which can provide communication with UE 1275 through a femto RAN 1290 linked to the femto network platform 120 via backhaul link(s) 1285, wherein backhaul link(s) are substantially the same a backhaul link 1140. The macro network platform 114 and the femto network platform 120 include respective functionality, as more fully described herein, for example, with regard to system 100. Further, UE 1275 can be substantially similar to UE 102 and UE 1120, and can include functionality, as more fully described herein, for example, with regard to systems 100-700 and 1100. It can be noted that femto network platform 120 typically offloads UE 1275 from macro network, once UE 1275 attaches (e.g., through a macro-to-femto handover that employs an augmented neighbor list) to femto RAN.

It is noted that RAN includes base station(s), or access point(s), and its associated electronic circuitry and deployment site(s), in addition to a wireless radio link operated in accordance with the base station(s). Accordingly, macro RAN 1270 can comprise various coverage cells like cell 1105, while femto RAN 1290 can comprise multiple femtocell access points like FAP 1130. As mentioned above, it is to be noted that deployment density in femto RAN 1290 is substantially higher than in macro RAN 1270.

Generally, both macro and femto network platforms (114 and 120) can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 114 includes CS gateway node(s) 1212 which can interface CS traffic received from legacy networks like telephony network(s) 1240 (e.g., public switched telephone network (PSTN), or public land mobile network (PLMN)) or a SS7 network 1260. Moreover, CS gateway node(s) 1212 interfaces CS-based traffic and signaling and gateway node(s) 1218.

In addition to receiving and processing CS traffic and signaling, gateway node(s) 1218 can authorize and authenticate PS-based data sessions with served (e.g., through macro RAN) wireless devices. Data sessions can include traffic exchange with networks external to the macro network platform 114, like wide area network(s) (WANs) 1250; it should be noted that local area network(s) (LANs) can also be interfaced with macro network platform 114 through gateway node(s) 1218. Gateway node(s) 1218 generates packet data contexts when a data session is established. It should be further noted that the packetized communication can include multiple flows that can be generated through server(s) 1214. Macro network platform 114 also includes serving node(s) 1216 that convey the various packetized flows of information, or data streams, received through gateway node(s) 1218. It is to be noted that server(s) 1214 can include one or more processor configured to confer at least in part the functionality of macro network platform 114. To that end, the one or more processor can execute code instructions stored in memory 1230, for example. In one example, CS gateway node(s) 1212 and/or PS gateway node(s) 1218 can include the network node 306 that facilitates provisioning the network server 314 and/or UE 1275 with femtocell data.

In example wireless environment 1200, memory 1230 stores information related to operation of macro network platform 114. Information can include business data associated with subscribers; market plans and strategies, e.g., promotional campaigns, business partnerships; operational data for mobile devices served through macro network platform; service and privacy policies; end-user service logs for law enforcement; and so forth. Memory 1230 can also store information from at least one of telephony network(s) 1240, WAN(s) 1250, or SS7 network 1260.

Femto gateway node(s) 1284 have substantially the same functionality as PS gateway node(s) 1218. Additionally, femto gateway node(s) 1284 can also include substantially all functionality of serving node(s) 1216. In an aspect, femto gateway node(s) 1284 facilitates handover resolution, e.g., assessment and execution. In one aspect, femto gateway node(s) 1284 can include network node 306 that facilitates provisioning the network server 314 and/or UE 1275 with femtocell data. Server(s) 1282 have substantially the same functionality as described in connection with server(s) 1214 and can include one or more processors configured to confer at least in part the functionality of macro network platform 114. Moreover, network server 314 can be part of server(s) 1282 and/or 1214. Further, the one or more processor can execute code instructions stored in memory 1286, for example.

Memory 1286 can include information relevant to operation of the various components of femto network platform 120. For example operational information that can be stored in memory 1286 can comprise, but is not limited to, subscriber information; contracted services; maintenance and service records; femtocell configuration (e.g., devices served through femto RAN 1290; access control lists, or white lists); service policies and specifications; privacy policies; add-on features; femto measurement data, and so forth Referring now to FIG. 13, there illustrated is a block diagram of a UE 1300 suitable for utilizing augmented neighbor lists to facilitate inbound handovers in accordance with the embodiments. Moreover, UE 1300 can be substantially similar to UEs 102, 1120, 1275, and can include functionality, as more fully described herein with respect to UE 102, 1120, 1275 in systems 100-700 and 1100-1200.

The UE 1300 can include a processor 1302 for controlling all onboard operations and processes. A memory 1304 can interface to the processor 1302 for storage of data and one or more applications 1306 being executed by the processor 1302. In an aspect, memory 1304 can include data store $304_2$ that stores femtocell data 202. A communications component 1308 can interface to the processor 1302 to facilitate wired/wireless communication with external systems (e.g., femtocell and macrocell). The communications component 1308 interfaces to a location component 1309 (e.g., GPS transceiver) that can facilitate location detection of the UE 1300. Note that the location component 1309 can also be included as part of the communications component 1308.

The UE 1300 can include a display 1310 for displaying content downloaded and/or for displaying text information related to operating and using the device features. A serial I/O interface 1312 is provided in communication with the processor 1302 to facilitate serial communication (e.g., USB, and/or IEEE 1394) via a hardwire connection. Audio capabilities are provided with an audio I/O component 1314, which can include a speaker for the output of audio signals related to, for example, recorded data or telephony voice data, and a microphone for inputting voice signals for recording and/or telephone conversations.

The device 1300 can include a slot interface 1316 for accommodating a subscriber identity module (SIM) 1318. Firmware 1320 is also provided to store and provide to the processor 1302 startup and operational data. The UE 1300 can also include an image capture component 1322 such as a camera and/or a video decoder 1324 for decoding encoded multimedia content. The UE 1300 can also include a power source 1326 in the form of batteries, which power source 1326 interfaces to an external power system or charging equipment via a power I/O component 1328. In addition, the UE 1300 can include a pre-provisioning interface 302, a monitoring component 502 and/or a handover management component 504, which can include respective functionality, as more fully described herein, for example, with regard to systems 100-700.

Figure 14:
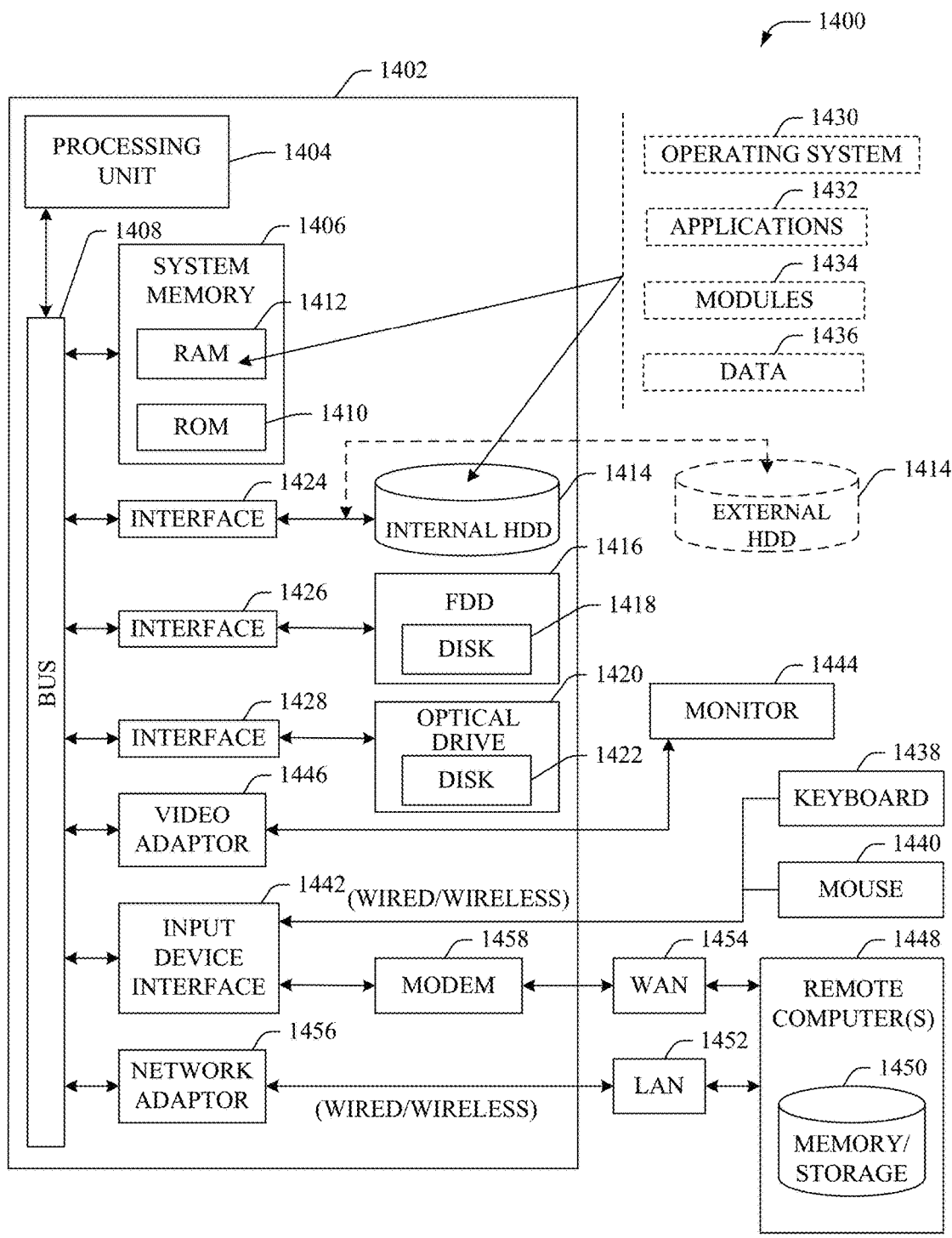
FIG. 14 illustrates a block diagram of a computer operable to execute the disclosed communication architecture.

Referring now to FIG. 14, there is illustrated a block diagram of a computer operable to execute the disclosed communication architecture. In order to provide additional context for various aspects of the subject specification, FIG. 14 and the following discussion are intended to provide a brief, general description of a suitable computing environment 1400 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various aspects of the specification includes a computer 1402, the computer 1402 including a processing unit 1404, a system memory 1406 and a system bus 1408. As an example, the equipment, gateway(s), entity(ies), component(s), server(s), node(s), interface(s), and platform(s) (e.g., user equipment 102, macro base station 104, femto access point 106, macro network platform 114, femto network platform 120, pre-provisioning interface 302, network node 306, monitoring component 502, handover management component 504, etc.) disclosed herein with respect to system 100-600 can each include at least a portion of the computer 1402. In another example, a combination of the equipment, gateway(s), entity(ies), component(s), server(s), node(s), interface(s), and platform(s) can each include one or more computers such as, or substantially similar to, computer 1402. Further, each of the network element(s) (stand alone and/or in combination with one or more other network elements) disclosed herein with respect to systems 1100 and 1200 can include at least a portion of computer 1402, or can include one or more computers such as, or substantially similar to, computer 1402. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various commercially available operating systems or combinations of operating systems.

A user can enter commands and information into the computer 1402 through one or more wired/wireless input devices, e.g., a keyboard 1438 and a pointing device, such as a mouse 1440 or a touchscreen or touchpad (not illustrated, but which may be integrated into UE 102 in some embodiments). These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc. A monitor 1444 or other type of display device is also connected to the system bus 1408 via an interface, such as a video adapter 1446.

The computer 1402 can operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving, from a data store of a macro cell device via a wireless communication channel, femtocell data that comprises a scrambling code and timing data for a user equipment to define a time period during which the user equipment is authorized to access a femtocell device;
        generating neighbor list data related to the macro cell device that satisfy a criterion associated with distance data;
        generating augmented neighbor list data by augmenting the neighbor list data with the femtocell data that comprises the scrambling code and the timing data that defines the time period during which the user equipment is authorized to access the femtocell device, wherein the generating the augmented neighbor list data comprises augmenting macrocell data of the neighbor list data with the femtocell data; and
        transferring, within the time period defined by the augmented neighbor list data, a first coupling between the user equipment and the system to a second coupling between the user equipment and the femtocell device based on the augmented neighbor list data that comprises the scrambling code and the timing data that defines the time period during which the user equipment is authorized to access the femtocell device.

2. The system of claim 1, wherein the generating the augmented neighbor list data comprises augmenting a portion of the neighbor list data with a frequency range included in the femtocell data.

3. The system of claim 1, wherein the transferring comprises transferring the first coupling to the second coupling based on location data indicative of a location for the femtocell device.

4. The system of claim 1, wherein the transferring comprises transferring the first coupling to the second coupling based on frequency data indicative of a carrier frequency associated with the femtocell device.

5. The system of claim 1, wherein the operations further comprise:
    receiving, from the user equipment, request data indicative of a request for the neighbor list data during a communication session being performed by the user equipment.

6. The system of claim 1, wherein the operations further comprise:
    storing the femtocell data in response to determining that identifier data, indicative of an identifier for the user equipment, is added to a data structure associated with the femtocell device.

7. A method, comprising:
    determining, by a network device comprising a processor, femtocell data that comprises a scrambling code and timing data for a mobile device to define a time period during which the mobile device is authorized to access a femtocell device, comprising receiving the femtocell data from a group of network devices via a wireless communication channel;
    generating, by the network device, neighbor group data, related to the group of network devices that are within a defined distance from the network device;
    augmenting the neighbor group data with the femtocell data, that comprises the scrambling code and the timing data that defines the time period during which the mobile device is authorized to access the femtocell device, to generate augmented neighbor group data, wherein the augmenting the neighbor group data comprises augmenting macrocell data of the neighbor group data with the femtocell data; and
    transmitting, by the network device, the augmented neighbor group data, that comprises the scrambling code to the mobile device to facilitate transferring, within the time period defined by the augmented neighbor group data, a first coupling between the mobile device and the network device to a second coupling between the mobile device and the femtocell device.

8. The method of claim 7, wherein the determining the femtocell data comprises determining the femtocell data in response to receiving request data indicative of a request for the neighbor group data.

9. The method of claim 7, wherein the augmenting comprises augmenting a previously generated version of the neighbor group data with the femtocell data.

10. The method of claim 7, wherein augmenting comprises filtering the neighbor group data based on location data indicative of a geographic location associated with the mobile device.

11. The method of claim 7, wherein the augmenting comprises generating the augmented neighbor group data based on frequency data indicative of a carrier frequency associated with the femtocell device.

12. The method of claim 7, further comprising:
storing, by the network device, the femtocell data in response to determining that identifier data, indicative of an identifier for the mobile device, is added to a data structure associated with the mobile device.

13. The method of claim 7, further comprising:
receiving, by the network device from the mobile device, request data indicative of a request for the neighbor group data during a communication session being performed by the mobile device.

14. A non-transitory machine-readable storage medium comprising executable instructions that, when executed by a processor, facilitate performance of operations, comprising:
receiving, from a network device, neighbor list data indicative of network devices within a defined distance from a user equipment;
receiving, from a base station device via wireless communication, femtocell data that comprises a scrambling code and timing data for the user equipment that specifies a time period during which the user equipment is authorized to access a femto access point device;
augmenting the neighbor list data with the femtocell data that comprises the scrambling code and the timing data that specifies the time period during which the user equipment is authorized to access the femto access point device to generate augmented neighbor list data, wherein the augmenting the neighbor list data comprises augmenting macrocell data of the neighbor list data with the femtocell data; and
transferring, within the time period defined by the augmented neighbor list data and based on the scrambling code, a first coupling between the user equipment and the base station device to a second coupling between the user equipment and the femto access point device.

15. The non-transitory machine-readable storage medium of claim 14, wherein the receiving the neighbor list data comprises receiving the neighbor list data prior to a scan of femto access point devices by the user equipment.

16. The non-transitory machine-readable storage medium of claim 14, wherein the augmenting comprises augmenting the neighbor list data based on identifier data indicative of an identifier for the femto access point device.

17. The non-transitory machine-readable storage medium of claim 14, wherein the transferring comprises transferring the first coupling to the second coupling based on a first geographic location associated with the user equipment and second geographic location associated with the femto access point device.

18. The non-transitory machine-readable storage medium of claim 14, wherein the operations further comprise:
transmitting, to the network device during a communication session associated with the user equipment, request data indicative of a request for the neighbor list data.

19. The non-transitory machine-readable storage medium of claim 14, wherein the operations further comprise:
scanning, based on the neighbor list data, frequencies to detect the femto access point device.

20. The non-transitory machine-readable storage medium of claim 14, wherein the augmenting comprises generating the augmented neighbor list data based on frequency data indicative of a carrier frequency associated with the femto access point device.

* * * * *